United States Patent
Zhou et al.

(10) Patent No.: US 10,636,223 B2
(45) Date of Patent: Apr. 28, 2020

(54) METHOD AND APPARATUS FOR PLACING MEDIA FILE, STORAGE MEDIUM, AND VIRTUAL REALITY APPARATUS

(71) Applicant: TENCENT TECHNOLOGY (SHENZHEN) COMPANY LIMITED, Shenzhen, Guangdong (CN)

(72) Inventors: Yang Zhou, Shenzhen (CN); Chen Zeng, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 0 days.

(21) Appl. No.: 16/448,201

(22) Filed: Jun. 21, 2019

(65) Prior Publication Data
US 2019/0304202 A1   Oct. 3, 2019

Related U.S. Application Data
(63) Continuation of application No. PCT/CN2018/081223, filed on Mar. 30, 2018.

(30) Foreign Application Priority Data

Apr. 7, 2017   (CN) .......................... 2017 1 0231730

(51) Int. Cl.
*G06T 19/00*   (2011.01)
*G06T 19/20*   (2011.01)
(Continued)

(52) U.S. Cl.
CPC .............. *G06T 19/20* (2013.01); *G06F 3/013* (2013.01); *G06Q 30/02* (2013.01); *G06T 2219/2004* (2013.01)

(58) Field of Classification Search
CPC combination set(s) only.
See application file for complete search history.

(56) References Cited

U.S. PATENT DOCUMENTS

| 7,058,896 B2 * | 6/2006 | Hughes ............... G06F 3/04815 345/419 |
| 8,487,838 B2 * | 7/2013 | Lewis .................... A61B 3/113 345/8 |

(Continued)

FOREIGN PATENT DOCUMENTS

| CN | 105812778 A | 7/2016 |
| CN | 106412563 A | 2/2017 |

OTHER PUBLICATIONS

International Search Report of PCT/CN2018/081223 dated Jul. 5, 2018.

*Primary Examiner* — Martin Mushambo
(74) *Attorney, Agent, or Firm* — Sughrue Mion, PLLC

(57) ABSTRACT

A method for placing a media file in a virtual three-dimensional space is provided. First position information of a visual residence area of a target object in the virtual three-dimensional space within each first preset time period is obtained, the visual residence area indicating an area to which an eye of the target object is directed in the virtual three-dimensional space. Visual distribution information of the target object in the virtual three-dimensional space is obtained based on the first position information within a second preset time period, the second preset time period including the first preset time period. A target placement position is generated in the virtual three-dimensional space based on the visual distribution information. A media file is provided at the target placement position in the virtual three-dimensional space.

20 Claims, 18 Drawing Sheets

(51) Int. Cl.
   *G06F 3/01*   (2006.01)
   *G06Q 30/02*  (2012.01)

(56) References Cited

U.S. PATENT DOCUMENTS

| | | |
|---|---|---|
| 9,176,582 B1 | 11/2015 | Johnson et al. |
| 9,323,325 B2 * | 4/2016 | Perez ................... G02B 27/017 |
| 10,048,751 B2 * | 8/2018 | Jaafar ..................... G06T 19/20 |
| 2016/0026242 A1 * | 1/2016 | Burns ..................... H04N 9/31 |
| | | 345/633 |
| 2017/0011557 A1 * | 1/2017 | Lee .......................... G06F 3/013 |
| 2017/0084084 A1 * | 3/2017 | Durham ................. G06F 3/013 |
| 2017/0285737 A1 * | 10/2017 | Khalid .................... G06F 3/013 |
| 2018/0150204 A1 * | 5/2018 | MacGillivray ......... G06F 3/012 |
| 2018/0293798 A1 * | 10/2018 | Energin .................. G06F 3/011 |

* cited by examiner

METHOD AND APPARATUS FOR PLACING MEDIA FILE, STORAGE MEDIUM, AND VIRTUAL REALITY APPARATUS

CROSS-REFERENCE TO RELATED APPLICATION(S)

This application is a continuation application of International Application No. PCT/CN2018/081223, filed with the Chinese Patent Office on Mar. 30, 2018, which claims priority to Chinese Patent Application No. 201710231730.6, entitled "METHOD AND APPARATUS FOR PLACING MEDIA FILE" filed with the Chinese Patent Office on Apr. 7, 2017, the disclosures of which are incorporated by reference in their entireties.

BACKGROUND

1. Field

Example embodiments relate to the field of media, and specifically, relate to a method and an apparatus for placing a media file, a storage medium, and a virtual reality (VR) device.

2. Description of the Related Art

Currently, in a virtual reality (VR) system, a user may move in a virtual three-dimensional space, and may perform various types of behaviors. Compared with a conventional two-dimensional (2D) planar system, in a VR system, a placement position of a media file is related to a residence position of a user in a three-dimensional space, a visual field orientation of the user at the residence position, and a residence position of the user in a visual field plane. Because respective virtual three-dimensional spaces are different from each other, placement positions of a media file in the respective virtual three-dimensional spaces are different, and a placement position of a media file in a virtual three-dimensional space is not effectively determined in the related technology.

In addition, in a VR system, the technology of directionally pushing a media file based on VR cannot solve a problem concerning a placement position of a media file. Generally, a designer needs to determine an advertisement (AD) placement position in a three-dimensional space according to experience of the user, which requires a need for manually determining a target placement position in the virtual three-dimensional space, resulting in a problem of low efficiency in media file placement.

For the foregoing problem of low efficiency in media file placement in the related technology, no effective solution has been provided.

SUMMARY

One or more example embodiments provide a method and an apparatus for placing a media file, a storage medium, and a virtual reality (VR) device, that solve at least a technical problem of low efficiency in media file placement in the related technology.

According to an aspect of an example embodiment, provided is a method for placing a media file in a virtual three-dimensional space is provided. First position information of a visual residence area of a target object in the virtual three-dimensional space within each first preset time period is obtained, the visual residence area indicating an area to which an eye of the target object is directed in the virtual three-dimensional space. Visual distribution information of the target object in the virtual three-dimensional space is obtained based on the first position information within a second preset time period, the second preset time period including the first preset time period. A target placement position is generated in the virtual three-dimensional space based on the visual distribution information. A media file is provided at the target placement position in the virtual three-dimensional space.

According to an aspect of an example embodiment, provided is an apparatus for placing a media file in a virtual three-dimensional space, including: at least one memory operable to store program code; and at least one processor operable to read the program code and operate as instructed by the program code, the program code including: first obtaining code configured to cause the at least one processor to obtain first position information of a visual residence area of a target object in the virtual three-dimensional space within each first preset time period, the visual residence area indicating an area to which an eye of the target object is directed in the virtual three-dimensional space; second obtaining code configured to cause the at least one processor to obtain visual distribution information of the target object in the virtual three-dimensional space based on the first position information within a second preset time period, the second preset time period including the first preset time period; generation code configured to cause the at least one processor to generate a target placement position in the virtual three-dimensional space based on the visual distribution information; and placement code configured to cause the at least one processor to provide a media file at the target placement position in the virtual three-dimensional space.

According to an aspect of an example embodiment, provided is a non-transitory computer storage medium storing instructions executable by at least one processor to perform: obtaining first position information of a visual residence area of a target object in the virtual three-dimensional space within each first preset time period, the visual residence area indicating an area to which an eye of the target object is directed in the virtual three-dimensional space; obtaining visual distribution information of the target object in the virtual three-dimensional space based on the first position information within a second preset time period, the second preset time period including the first preset time period; generating a target placement position in the virtual three-dimensional space based on the visual distribution information; and providing a media file at the target placement position in the virtual three-dimensional space.

According to an aspect of an example embodiment, a VR device is further provided. The VR device includes a memory and a processor, the memory storing a computer program, the processor being configured to perform, through the computer program, the method in the embodiments.

In the example embodiments of the disclosure, a manner in which first position information of a visual residence area of a target object in a virtual three-dimensional space within each first preset time period is obtained; visual distribution information of the target object in the virtual three-dimensional space is obtained according to the first position information within a second preset time period, the second preset time period including the first preset time period; a target placement position in the virtual three-dimensional space is generated according to the visual distribution information; and a media file is placed at the target placement position in the virtual three-dimensional space is used. Because the visual distribution information is obtained according to the first position information of the visual residence area of the target object in the virtual three-dimensional space within each first preset time period, the target placement position in the virtual three-dimensional space is generated according to the visual distribution information, and further, the media file is placed at the target placement position, a problem of low media file placement efficiency resulting from manually determining a target placement position in a virtual three-dimensional space is avoided, and a media file is placed in a virtual three-dimensional space, thereby achieving a technical effect of improving media file placement efficiency, and further solving the technical problem of low media file placement efficiency in the related technology.

BRIEF DESCRIPTION OF THE DRAWINGS

These and/or other aspects will become apparent and more readily appreciated from the following description of the embodiments, taken in conjunction with the accompanying drawing.

DETAILED DESCRIPTION

To make a person skilled in the art understand the solutions in the disclosure better, the following clearly and completely describes the technical solutions in the example embodiments with reference to the accompanying drawings. Apparently, the described embodiments are merely some but not all of the embodiments. All other embodiments obtained by a person of ordinary skill in the art based on the embodiments without creative efforts shall fall within the protection scope.

It should be noted that the terms "first", "second", and the like in the specification, the claims, and the foregoing accompanying drawings of the disclosure are merely used for distinguishing similar objects, and do not need to be used for describing a special sequence or order. It should be understood that data used in this way can be interchanged in an appropriate case, so that the embodiments of the disclosure that are described herein can be implemented in a sequence other than those sequences illustrated or described herein. Moreover, the terms "include", "have", and any variants thereof are intended to cover a non-exclusive inclusion. Therefore, a process, method, system, product, or device that includes a series of operations or elements not only includes such operations or elements that are clearly listed, but also includes other operations or elements that are not clearly listed or that are inherent to the process, method, product, or device.

According to an aspect of the embodiments, an embodiment of a method for placing a media file is provided.

Figure 1A:
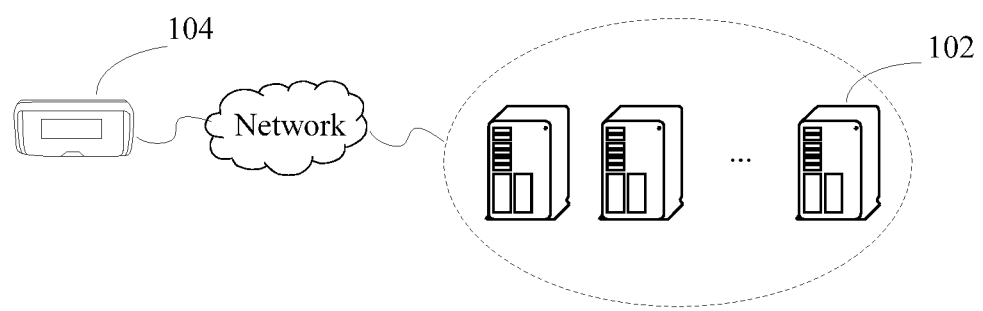
FIG. 1A is a schematic diagram of a hardware environment of a method for placing a media file according to an embodiment.

Optionally, in an example embodiment, a method for placing a media file may be applied to a hardware environment including a server 102 and a VR device 104 shown in FIG. 1A. FIG. 1A is a schematic diagram of a hardware environment of a method for placing a media file according to an embodiment. As shown in FIG. 1, the server 102 is connected to the VR device 104 through a network and may be a server corresponding to a media file provider. The foregoing network includes, but is not limited to, a wide area network, a metropolitan area network, or a local area network. The foregoing VR device 104 is not limited to: a VR helmet, VR glasses, a VR all-in-one machine, and the like.

Optionally, the VR device 104 includes: a memory, a processor, and a transmission apparatus. The memory is configured to store an application program. The application program may be configured to perform: obtaining first position information of a visual residence area of a target object in a virtual three-dimensional space within each first preset time period, the visual residence area indicating an area to which an eye of the target object is directed in the virtual three-dimensional space; obtaining visual distribution information of the target object in the virtual three-dimensional space according to the first position information within a second preset time period, the second preset time period including the first preset time period; generating a target placement position in the virtual three-dimensional space according to the visual distribution information; and placing a media file at the target placement position in the virtual three-dimensional space. Because the visual distribution information is obtained according to the first position information of the visual residence area of the target object in the virtual three-dimensional space within each first preset time period, the target placement position in the virtual three-dimensional space is generated according to the visual distribution information. Further, the media file is placed at the target placement position, and therefore, a problem of low efficiency in media file placement resulting from manually determining a target placement position in a virtual three-dimensional space is avoided, and a media file is placed in a virtual three-dimensional space.

The processor in an example embodiment may invoke, through a transmission apparatus, the application program stored in the foregoing memory to perform operations. The transmission apparatus may receive, through a network, a media file sent from a server, or may be configured to perform data transmission between the processor and the memory.

Optionally, in the VR device 104, a head mount display (HMD) with an eye tracking function is provided. A screen in the HMD is configured to display a real-time picture. An eye tracking module in the HMD is configured to obtain a real-time moving track of an eye of a user. A tracking system is configured to track position information and motion information of the user in a real three-dimensional space. A calculation processing unit is configured to obtain real-time position and motion information of the user from the tracking system, and calculate three-dimensional coordinates of the head of the user in the virtual three-dimensional space, a visual field orientation of the user in the virtual three-dimensional space, and the like.

Figure 1B:
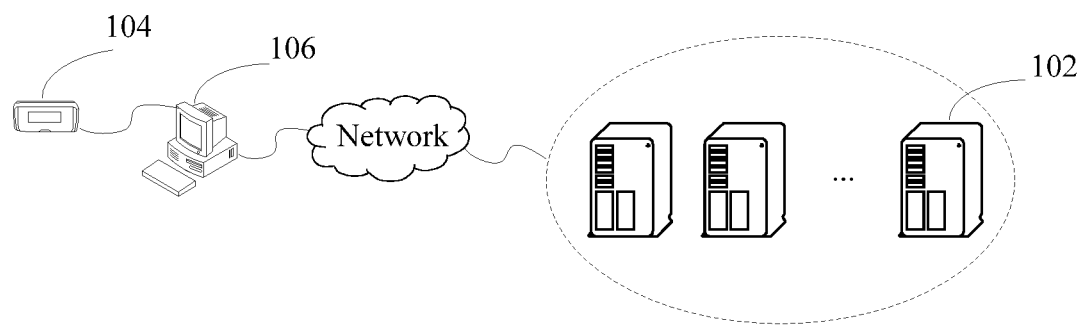
FIG. 1B is a schematic diagram of a hardware environment of another method for placing a media file according to an embodiment.

FIG. 1B is a schematic diagram of a hardware environment of another method for placing a media file according to an embodiment. As shown in FIG. 1B, a VR device 104 is connected to a terminal 106, and the terminal 106 is connected to a server 102 through a network. The foregoing VR device 104 is not limited to: a VR helmet, VR glasses, a VR all-in-one machine, and the like. The foregoing terminal 106 is not limited to a PC, a mobile phone, a tablet computer, and the like. The server 102 may be a server corresponding to a media file operator. The foregoing network includes, but is not limited to, a wide area network, a metropolitan area network, or a local area network.

Optionally, functions of the VR device 104 in this embodiment may be the same or similar to those in the foregoing embodiment. The terminal 106 in an example embodiment may be configured to calculate first position information of a visual residence area of a target object in a virtual three-dimensional space within each first preset time period, visual distribution information of the target object in the virtual three-dimensional space, and a target placement position in the virtual three-dimensional space generated according to the visual distribution information, receive a media file delivered by the server, and send the media file to the VR device 104. After receiving the media file, the VR device 104 displays the media file at the target placement position.

Optionally, effects of an HMD with an eye tracking function and an eye tracking module provided in the VR device 104 in this embodiment may be the same or similar to those in the foregoing embodiment. That is, a screen in the HMD is configured to display a real-time picture. An eye tracking module in the HMD is configured to obtain a real-time moving track of an eye of a user. The terminal 106 in this embodiment obtains, through a tracking system, position information and motion information of the user in a real three-dimensional space, and calculates three-dimensional coordinates of the head of the user in the virtual three-dimensional space, a visual field orientation of the user in the virtual three-dimensional space, and the like.

A method for placing a media file of embodiments is described below in detail.

Figure 2:
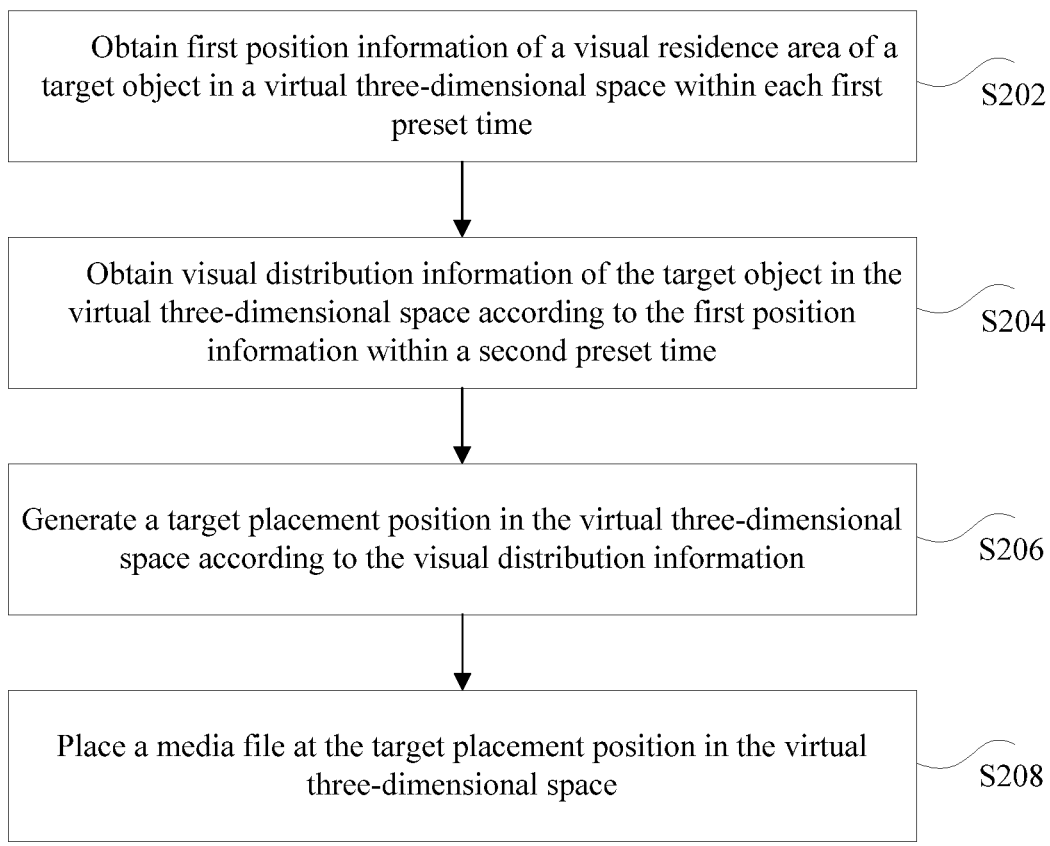
FIG. 2 is a flowchart of a method for placing a media file according to an embodiment.

FIG. 2 is a flowchart of a method for placing a media file according to an embodiment. As shown in FIG. 2, the method for placing a media file may include the following operations S202 to S208:

Operation S202: Obtain first position information of a visual residence area of a target object in a virtual three-dimensional space within each first preset time period.

In the technical solution provided by operation S202 of the disclosure, the target object may be a user located in the virtual three-dimensional space, where the virtual three-dimensional space is generated by a VR system. The first preset time period is a predetermined unit time. When the first position information of the visual residence area of the target object in the virtual three-dimensional space within each first preset time period is obtained, a residence position of the target object in the virtual three-dimensional space may be obtained at a current time point. Optionally, position coordinates of the head of the target object in the virtual three-dimensional space at the current time point are obtained, a visual field orientation of the target object in the virtual three-dimensional space is obtained, and a visual residence plane of the target object is obtained based on a preset parameter according to the position coordinates of the head of the target object in the virtual three-dimensional space and the visual field orientation of the target object in the virtual three-dimensional space. The preset parameter may be provided by a developer. If the developer does not provide the preset parameter, the preset parameter may be calculated based on empirical data, where the empirical data may be an optimal visual range, a field of view (FOV), and the like.

After the visual residence plane of the target object is obtained, an eye direction of the target object at the current time point is obtained, and a visual residence area of the target object on the visual residence plane is obtained according to the eye direction of the target object. Optionally, data of a visual area (or a size of a visual area) in which a visual area of high definition (e.g., a preset definition or higher) can be provided to a human eye is obtained, the foregoing visual residence area of the target object on the visual residence plane is obtained according to the eye direction of the target object and the foregoing data, and the position information of each point in the visual residence area may be recorded.

Optionally, repetition of operation is continued in a next first preset time period. The visual residence area of the target object in the virtual three-dimensional space is recorded, three-dimensional coordinates of each point in the visual residence area may be recorded, and a visual residence time of the target object at each point in the visual residence area is counted until the target object leaves the virtual three-dimensional space. The visual residence time may indicate a time period in which an eye of the target object is directed toward the visual residence area (or the visual residence area viewed by the target object). When the target object leaves the virtual three-dimensional space, a residence time from a time point when the target object enters the virtual three-dimensional space to a time point when the target object leaves the virtual three-dimensional space is recorded.

Operation S204: Obtain visual distribution information of the target object in the virtual three-dimensional space according to the first position information within a second preset time period.

In the technical solution provided by operation S204 of the disclosure, the second preset time period includes the first preset time period.

After the first position information of the visual residence area of the target object in the virtual three-dimensional space within each first preset time period is obtained, the visual distribution information of the target object in the virtual three-dimensional space is obtained according to the first position information within the second preset time period including the first preset time period. That is, the visual distribution information of the target object in the virtual three-dimensional space within a period of time is obtained. Optionally, a visual residence amount of each point is calculated according to the visual residence time of each point in the first position information, and the visual distribution information of the target object in the virtual three-dimensional space is obtained according to the visual residence amount of each point. The visual residence amount of each point is obtained by performing normalization processing on the visual residence time of each point according to the residence time of the target object in the virtual three-dimensional space, a visual residence time corresponding to a point having no visual residence amount is zero, and further, the visual distribution information of the target object in the virtual three-dimensional space is obtained.

Operation S206: Generate a target placement position in the virtual three-dimensional space according to the visual distribution information.

In the technical solution provided by operation S206 of the disclosure, after the visual distribution information of the target object in the virtual three-dimensional space is obtained according to the first position information, the target placement position in the virtual three-dimensional space is generated according to the visual distribution information.

Optionally, in this embodiment, a page section capable of covering a largest visual residence amount is automatically calculated according to the visual distribution information. A size of the page section is adjustable, and the page section may have a flat surface or a curved surface. This is not limited herein. Optionally, a position of the target placement position of the media file in the page section is determined according to a type of the media file. For example, for a main text media file, the target placement position may be a sub-page section having a largest visual residence amount in the page section, and for a sidebar media file, the target placement position may be a sub-page section apart from a side edge of the page section by a distance. In an example embodiment, an area of the sub-page section may be smaller than an area of the page section, thereby improving visual experience of a user. Accordingly, an example embodiment may automatically determine a target placement position of a media file in a virtual three-dimensional space and avoid the problem of a need to manually determine a target placement position in a virtual three-dimensional space in the conventional technology.

Operation S208: Place a media file at the target placement position in the virtual three-dimensional space.

In the technical solution provided by operation S208 of the disclosure, after the target placement position in the virtual three-dimensional space is generated according to the visual distribution information, the media file is placed at the target placement position in the virtual three-dimensional space. When the media file is a main text media file, for example, a media file that disappears after being played for a period of time, the media file may be placed at a target placement position having a largest visual residence amount in the page section, and when the media file is a sidebar media file, for example, a media file played next to a main text media file, the media file may be placed in a sub-page section apart from an upper side, a lower side, a left side, or a right side of the page section by a distance, to place a media file in a virtual three-dimensional space, thereby achieving an effect of improving media file placement efficiency.

It should be noted that the type of the media file is not specifically limited in this embodiment. The media file may be a video file, an audio file, a picture file, a text file, or the like, or any combination of the several types of files, for example, a combination of a text file and a picture file or a combination of a video file and a text file. A specific product form may be, for example, a video advertisement (AD), a native AD, or a search AD.

In operation S202 to operation S208, first position information of a visual residence area of a target object in a virtual three-dimensional space within each first preset time period is obtained; visual distribution information of the target object in the virtual three-dimensional space is obtained according to the first position information within a second preset time period, the second preset time period including the first preset time period; a target placement position in the virtual three-dimensional space is generated according to the visual distribution information; and a media file is placed at the target placement position in the virtual three-dimensional space. Thus, according to an embodiment, the visual distribution information is obtained according to the first position information of the visual residence area of the target object in the virtual three-dimensional space within each first preset time period, the target placement position in the virtual three-dimensional space is generated according to the visual distribution information, and further, the media file is placed at the target placement position. Accordingly, a problem of low media file placement efficiency resulting from manually determining a target placement position in a virtual three-dimensional space is avoided, and a media file is placed in a virtual three-dimensional space. Therefore, a technical effect of improving media file placement efficiency is achieved and a technical problem of low media file placement efficiency in the related technology is solved.

In an optional implementation, operation S202 of obtaining first position information of a visual residence area of a target object in a virtual three-dimensional space within each first preset time period includes: obtaining the visual residence area of the target object on the first visual residence plane in the virtual three-dimensional space according to a first moving track and a preset visual range of an eye of the target object within the first preset time period, and recording the first position information of the visual residence area on the first visual residence plane in the virtual three-dimensional space.

Figure 3:
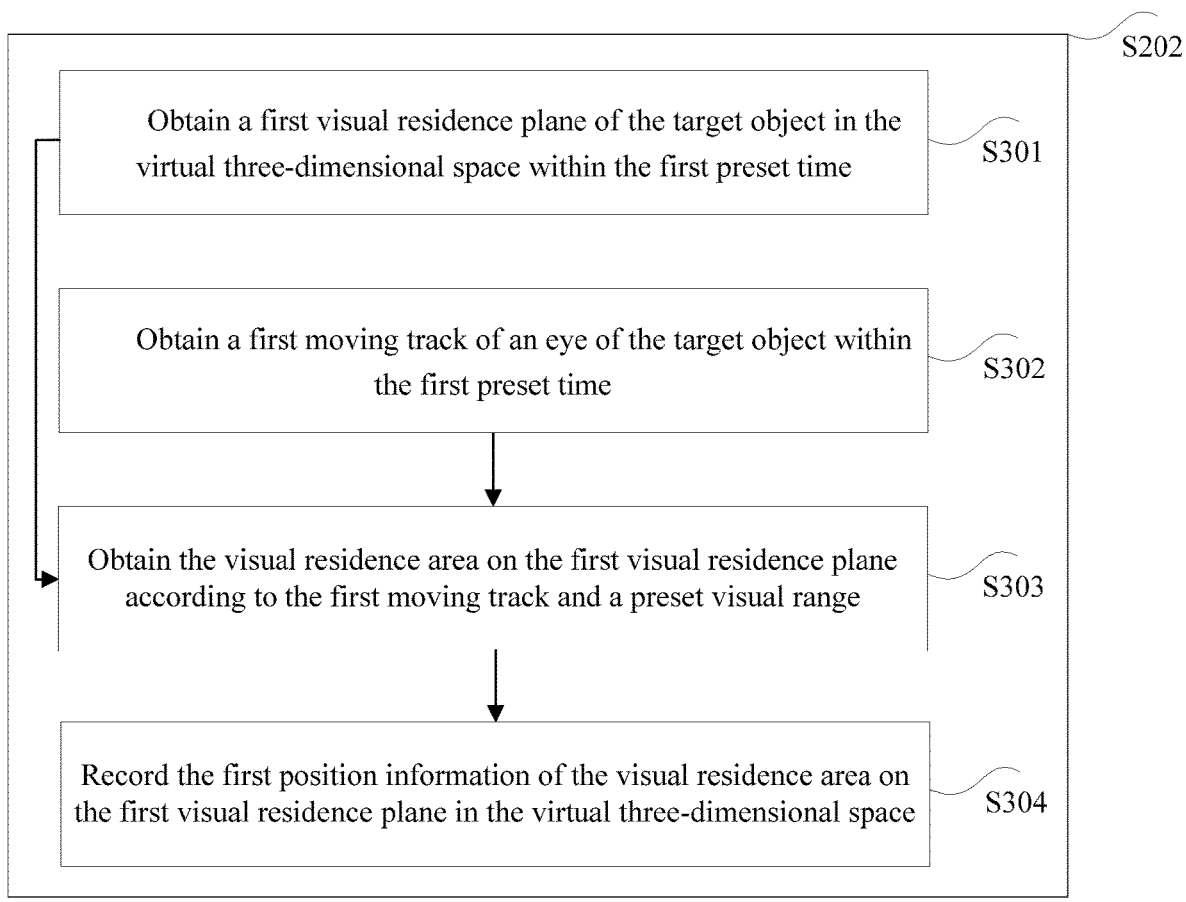
FIG. 3 is a flowchart of a method for obtaining first position information of a visual residence area of a target object in a virtual three-dimensional space within each first preset time period according to an embodiment.

FIG. 3 is a flowchart of a method for obtaining first position information of a visual residence area of a target object in a virtual three-dimensional space within each first preset time period according to an embodiment. As shown in FIG. 3, the method includes operations S301-S304:

Operation S301: Obtain a first visual residence plane of the target object in the virtual three-dimensional space within the first preset time period.

In the technical solution provided by operation S301 of the disclosure, the first preset time period is a predetermined unit time and is a cycle that is used for determining to collect statistics about the first position information when the first position information of the visual residence area of the target object in the virtual three-dimensional space is obtained. The first visual residence plane of the target object in the virtual three-dimensional space is obtained within the first preset time period. The first visual residence plane is a plane where vision of the target object resides in a virtual three-dimensional scene, and a length and a width of the first visual residence plane may be obtained by performing calculation on position information of the head of the target object in the virtual three-dimensional space, a visual field orientation, and a preset parameter. The preset parameter may be provided by a developer. If the developer does not provide the preset parameter, the preset parameter may be calculated based on empirical data, where the empirical data may be an optimal visual range, an FOV, and the like. Further, the first visual residence plane is determined according to the length and the width of the first visual residence plane. Optionally, three-dimensional coordinates of each point on the first visual residence plane in the virtual three-dimensional space are obtained according to the position information of the head of the target object in the virtual three-dimensional space, the visual field orientation, and the preset parameter.

Operation S302: Obtain a first moving track of an eye of the target object within the first preset time period.

In the technical solution provided by operation S302 of the disclosure, a first moving track of the eye of the target object within the first preset time period may be obtained by using an eye tracking device of an HMD, and the first moving track may be determined by using an eye direction of the target object. The eye direction of the target object may be represented by spherical coordinates (1, $\theta$, $\varphi$).

Operation S303: Obtain the visual residence area on the first visual residence plane according to the first moving track and a preset visual range.

In the technical solution provided by operation S303 of the disclosure, the preset visual range is a visual range in which a visual area of a preset definition or higher can be provided to the target object in the three-dimensional space when viewed by the target object.

After the first visual residence plane of the target object in the virtual three-dimensional space is obtained within the first preset time period, and the first moving track of the eye of the target object within the first preset time period is obtained, the preset visual range is determined. The preset visual range may be a predetermined visual range (or a predetermined range of a viewing angle) in which a visual area of a preset definition or higher can be provided to the target object in the three-dimensional space when the target object views the visual area. Optionally, the preset visual range is 1° to 2°. After the preset visual range is determined, the visual residence area on the first visual residence plane is obtained according to the first moving track and the preset visual range. A shape of the visual residence area may be a circular shape, an elliptical shape, or the like. This is not limited herein.

Operation S304: Record the first position information of the visual residence area on the first visual residence plane in the virtual three-dimensional space.

In the technical solution provided by operation S304 of the disclosure, after the visual residence area on the first visual residence plane is obtained, the first position information of the visual residence area on the first visual residence plane in the virtual three-dimensional space is obtained, and three-dimensional coordinates of each point in the visual residence area on the first visual residence plane may be recorded.

In this embodiment, a first visual residence plane of the target object in the virtual three-dimensional space is obtained within the first preset time period; a first moving track of an eye of the target object within the first preset time period is obtained; the visual residence area on the first visual residence plane is obtained according to the first moving track and a preset visual range, where the preset visual range is a visual range in which a visual area of a preset definition or higher can be provided to the target object in the three-dimensional space when viewed by the target object; and the first position information of the visual residence area on the first visual residence plane in the virtual three-dimensional space is recorded, so that the first position information of the visual residence area of the target object in the virtual three-dimensional space within each first preset time period is obtained. Further, the visual distribution information of the target object in the virtual three-dimensional space is obtained according to the first position information, and the target placement position in the virtual three-dimensional space is generated according to the visual distribution information. Finally, the media file is placed at the target placement position in the virtual three-dimensional space, thereby improving media file placement efficiency.

In an optional implementation, operation S301 of obtaining a first visual residence plane of the target object in the virtual three-dimensional space includes processing second position information of the head of the target object in the virtual three-dimensional space and visual field orientation information of the target object according to a preset parameter, to obtain the first visual residence plane of the target object in the virtual three-dimensional space.

Figure 4:
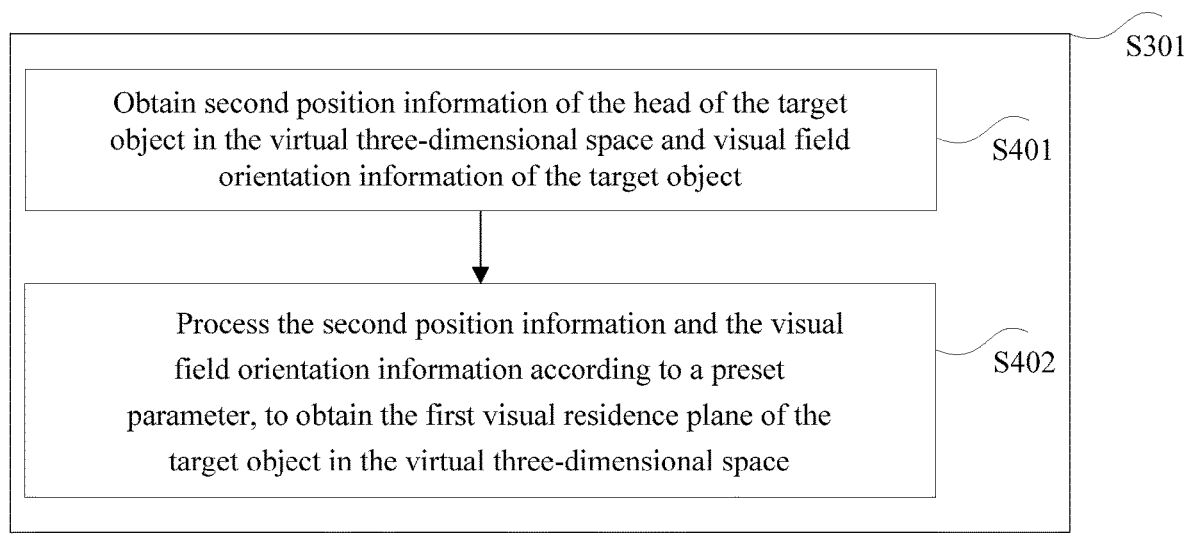
FIG. 4 is a flowchart of a method for obtaining a first visual residence plane of a target object in a virtual three-dimensional space according to an embodiment.

FIG. 4 is a flowchart of a method for obtaining a first visual residence plane of a target object in a virtual three-dimensional space according to an embodiment. As shown in FIG. 4, the method includes operations:

Operation S401: Obtain second position information of the head of the target object in the virtual three-dimensional space and visual field orientation information of the target object.

In the technical solution provided by operation S401 of the disclosure, the visual field orientation information is used for indicating an orientation of a visual field of the target object in the virtual three-dimensional space.

When the first visual residence plane of the target object in the virtual three-dimensional space is obtained, position information and motion information of the target object in a real three-dimensional space may be tracked by using a tracking system of the VR system, the position information and the motion information of the target object in the real three-dimensional space are obtained by a calculation processing unit of the VR system from the tracking system. Accordingly, second position information of the head of the target object in the virtual three-dimensional space at a current time point and visual field orientation information of the head of the user at the current time point may be obtained. The second position information may be represented by three-dimensional coordinates (x, y, z), and the visual field orientation information may be represented by a vector ($\alpha$, $\beta$, $\gamma$).

Operation S402: Process the second position information and the visual field orientation information according to a preset parameter, to obtain the first visual residence plane of the target object in the virtual three-dimensional space.

In the technical solution provided by operation S402 of the disclosure, after the second position information of the head of the target object in the virtual three-dimensional space and the visual field orientation information of the target object are obtained, the second position information and the visual field orientation information are processed based on a preset parameter. The preset parameter may be provided by a developer. If the developer does not provide the preset parameter, the preset parameter may be calculated based on empirical data. For example, the preset parameter is an optimal visual range (d), such as, for example, 2.5 m, or may be an FOV, such as, for example, 90°. Specific data of the optimal visual range and the FOV does not affect processing algorithms of the second position information and the visual field orientation information. Accordingly, the second position information and the visual field orientation information are processed according to optimal visual range and the FOV, to obtain the first visual residence plane of the target object in the virtual three-dimensional space.

It should be noted that the empirical data included in the foregoing embodiments is merely example data of the embodiments, and it is not limited that only the foregoing data is used as empirical data of the embodiments. Any empirical data that can improve media file placement efficiency falls within the protection scope. Details are not described herein again.

Optionally, a length and a width of the first visual residence plane are obtained by performing processing according to the second position information and the visual field orientation information as the optimal visual range and the FOV, and further, the first visual residence plane is obtained according to the length and the width of the first visual residence plane.

In this embodiment, the second position information of the head of the target object in the virtual three-dimensional space and the visual field orientation information of the target object are obtained. The visual field orientation information is used for indicating an orientation of a visual field of the target object in the virtual three-dimensional space. The second position information and the visual field orientation information are processed according to a preset parameter, to obtain the first visual residence plane of the target object in the virtual three-dimensional space, thereby obtaining the first visual residence plane of the target object in the virtual three-dimensional space.

In an optional implementation, operation S301 of obtaining a first visual residence plane of the target object in the virtual three-dimensional space includes: obtaining first three-dimensional coordinates of each point in the first visual residence plane in the three-dimensional space; and operation S304 of recording the first position information of the visual residence area on the first visual residence plane in the virtual three-dimensional space includes: obtaining, from the first three-dimensional coordinates, second three-dimensional coordinates of each point in the visual residence area on the first visual residence plane in the virtual three-dimensional space; and recording the second three-dimensional coordinates.

When the first visual residence plane of the target object in the virtual three-dimensional space is obtained, the first three-dimensional coordinates of each point in the first visual residence plane in the three-dimensional space are obtained. The first three-dimensional coordinates of each point in the first visual residence plane in the three-dimensional space may be obtained based on a series of preset parameters, the position information of the head of the target object in the virtual three-dimensional space, and the visual field orientation information of the target object in the virtual three-dimensional space. The preset parameters may be provided by a developer. If the developer does not provide the preset parameters, the first three-dimensional coordinates of each point in the first visual residence plane in the three-dimensional space may be obtained based on empirical data.

The first three-dimensional coordinates in this embodiment include the second three-dimensional coordinates, and when the first position information of the visual residence area on the first visual residence plane in the virtual three-dimensional space is recorded, each point in the visual residence area on the first visual residence plane is determined, and the second three-dimensional coordinates of each point in the visual residence area in the virtual three-dimensional space are obtained from the first three-dimensional coordinates.

In an optional implementation, after the first position information of the visual residence area in the virtual three-dimensional space is recorded, if the target object does not leave the virtual three-dimensional space, a second moving track of the eye of the target object within the first preset time period is obtained; a visual residence area of the target object on a second visual residence plane in the virtual three-dimensional space is obtained according to the second moving track of the eye of the target object within the first preset time period and a preset visual range, and first position information of the visual residence area on the second visual residence plane in the virtual three-dimensional space is recorded.

Figure 5:
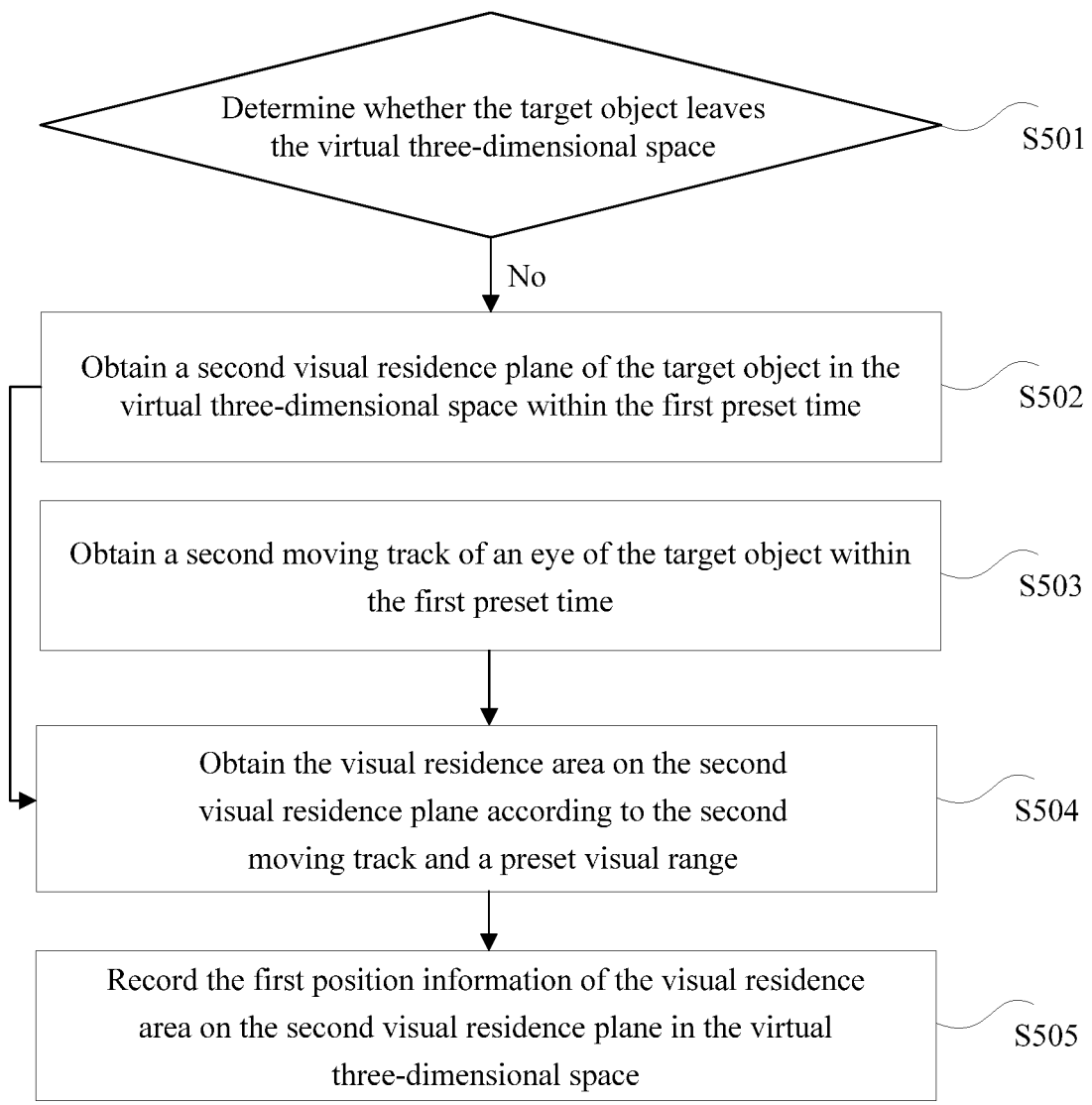
FIG. 5 is a flowchart of another method for placing a media file according to an embodiment.

FIG. 5 is a flowchart of another method for placing a media file according to an embodiment. As shown in FIG. 5, the method for placing a media file may further include operations S501 to S505:

Operation S501: Determine whether the target object leaves the virtual three-dimensional space.

In the technical solution provided by operation S501 of the disclosure, after the first position information of the visual residence area in the virtual three-dimensional space is recorded, that is, after the first position information of the visual residence area in the virtual three-dimensional space within one unit time is recorded, whether the target object leaves the virtual three-dimensional space is determined, and if it is determined that the target object does not leave the virtual three-dimensional space, operation S502 is performed.

Operation S502: Obtain a second visual residence plane of the target object in the virtual three-dimensional space within the first preset time period.

In the technical solution provided by operation S502 of the disclosure, the second visual residence plane of the target object in the virtual three-dimensional space is obtained within the first preset time period if it is determined that the target object does not leave the virtual three-dimensional space.

Optionally, in a next unit time, second position information of the head of the target object in the virtual three-dimensional space and visual field orientation information of the target object are obtained, and the second position information and the visual field orientation information are processed according to the preset parameter, to obtain the second visual residence plane of the target object in the virtual three-dimensional space in the next unit time.

Operation S503: Obtain a second moving track of an eye of the target object within the first preset time period.

In the technical solution provided by operation S503 of the disclosure, when the second moving track of the eye of the target object in the next unit time is obtained, the second moving track of the eye of the target object in the next unit time may be obtained by using an eye tracking device of the HMD, and the second moving track may be determined according to an eye direction of the target object in the next unit time. The eye direction of the target object may be represented by spherical coordinates $(1, \theta, \varphi)$.

Operation S504: Obtain the visual residence area on the second visual residence plane according to the second moving track and a preset visual range.

In the technical solution provided by operation S504 of the disclosure, after the second visual residence plane of the target object in the virtual three-dimensional space is obtained, and the second moving track of the eye of the target object within the first preset time period is obtained, the preset visual range is determined. The preset visual range may be a predetermined visual range in which a visual area of a preset definition or higher can be provided to the target object in the three-dimensional space when viewed by the target object. Optionally, the preset visual range is 1° to 2°. After the preset visual range is determined, the visual residence area on the second visual residence plane is obtained according to the second moving track and the preset visual range. A shape of the visual residence area may be a circular shape, an elliptical shape, or the like. This is not limited herein.

Operation S505: Record the first position information of the visual residence area on the second visual residence plane in the virtual three-dimensional space.

In the technical solution provided by operation S505 of the disclosure, after the visual residence area on the second visual residence plane is obtained, the first position information of the visual residence area on the second visual residence plane in the virtual three-dimensional space is recorded, and three-dimensional coordinates of each point in the visual residence area on the second visual residence plane may be recorded.

In this embodiment, after the first position information of the visual residence area in the virtual three-dimensional space is recorded, whether the target object leaves the virtual three-dimensional space is determined; a second visual residence plane of the target object in the virtual three-dimensional space is obtained within the first preset time period if it is determined that the target object does not leave the virtual three-dimensional space; a second moving track of the eye of the target object within the first preset time period is obtained; the visual residence area on the second visual residence plane is obtained according to the second moving track and the preset visual range; and the first position information of the visual residence area on the second visual residence plane in the virtual three-dimensional space is recorded. Further, the visual distribution information of the target object in the virtual three-dimensional space is obtained according to the first position information within the second preset time period including the first preset time period. Finally, the media file is placed at the target placement position in the virtual three-dimensional space, thereby achieving a technical effect of improving media file placement efficiency.

In an optional implementation, after whether the target object leaves the virtual three-dimensional space is determined, a residence time of the target object in the virtual three-dimensional space is recorded if it is determined that the target object leaves the virtual three-dimensional space. That is, a time period from a time when the target object enters the virtual three-dimensional space to a time when the target object leaves the virtual three-dimensional space is recorded. The residence time of the target object in the virtual three-dimensional space is used for performing normalization processing on each point in the virtual three-dimensional space.

In an optional implementation, operation S204 of obtaining visual distribution information of the target object in the virtual three-dimensional space according to the first position information includes: performing normalization processing on a visual residence time of visual residence performed by the target object at each point in the first position information according to the residence time of the target object in the virtual three-dimensional space to obtain a visual residence amount of each point; and generating the visual distribution information from the visual residence amount of each point.

Figure 6:
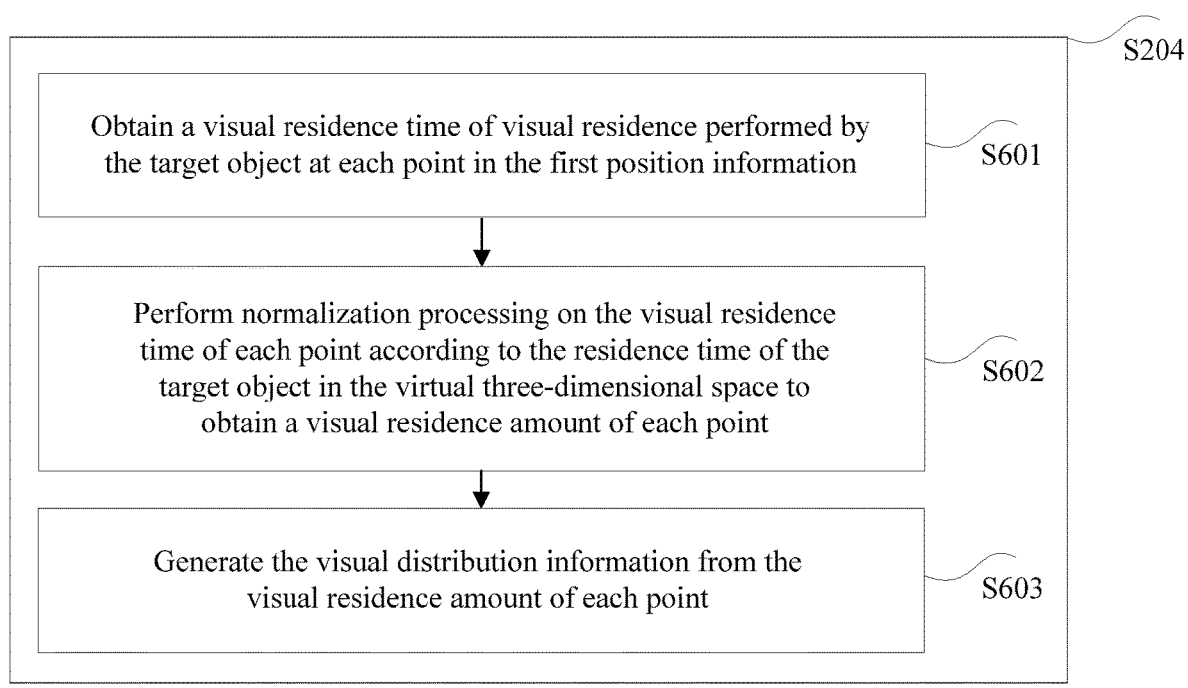
FIG. 6 is a flowchart of a method for obtaining visual distribution information of a target object in a virtual three-dimensional space according to first position information according to an embodiment.

FIG. 6 is a flowchart of a method for obtaining visual distribution information of a target object in a virtual three-dimensional space according to first position information according to an embodiment. As shown in FIG. 6, the method includes operations S601 to S603:

Operation S601: Obtain a visual residence time of visual residence performed by the target object at each point in the first position information.

In the technical solution provided by operation S601 of the disclosure, after the first position information of the visual residence area of the target object in the virtual three-dimensional space within each first preset time period is obtained, a visual residence time of visual residence performed by the target object at each point in the first position information is counted. A visual residence time of a point having no visual residence amount in the virtual three-dimensional space is zero.

Operation S602: Perform normalization processing on the visual residence time of each point according to the residence time of the target object in the virtual three-dimensional space to obtain a visual residence amount of each point.

In the technical solution provided by operation S602 of the disclosure, after the visual residence time of visual residence performed by the target object at each point in the first position information is obtained, normalization processing is performed on the visual residence time of each point according to the residence time of the target object in the virtual three-dimensional space. The visual residence time of each point may be divided by the residence time of the target object in the virtual three-dimensional space, to obtain the visual residence amount of each point.

Operation S603: Generate the visual distribution information from the visual residence amount of each point.

In the technical solution provided by operation S603 of the disclosure, after normalization processing is performed on the visual residence time of each point according to the residence time of the target object in the virtual three-dimensional space, visual distribution information is generated from the visual residence amount of each point. The visual distribution information may be represented by a visual distribution diagram. In the visual distribution diagram, magnitudes of visual residence amounts of respective points may be represented by different colors. For example, a point having a large visual residence amount is represented by red, a point having a small visual residence amount is represented by blue, and a point having a visual residence amount of zero is represented by another no color area.

In this embodiment, a visual residence time of visual residence performed by the target object at each point in the first position information is obtained; normalization processing is performed on the visual residence time of each point according to the residence time of the target object in the virtual three-dimensional space to obtain a visual residence amount of each point; and the visual distribution information is generated from the visual residence amount of each point. The visual distribution information of the target object in the virtual three-dimensional space is obtained according to the first position information. Further, the target placement position in the virtual three-dimensional space is generated according to visual distribution information. Finally, the media file is placed at the target placement position in the virtual three-dimensional space, thereby improving media file placement efficiency.

In an optional implementation, operation S206 of generating a target placement position in the virtual three-dimensional space according to the visual distribution information includes: generating a first target page section from a largest visual residence amount in the visual distribution information; and determining, according to a type of the media file, a preset position in the first target page section as the target placement position.

Figure 7:
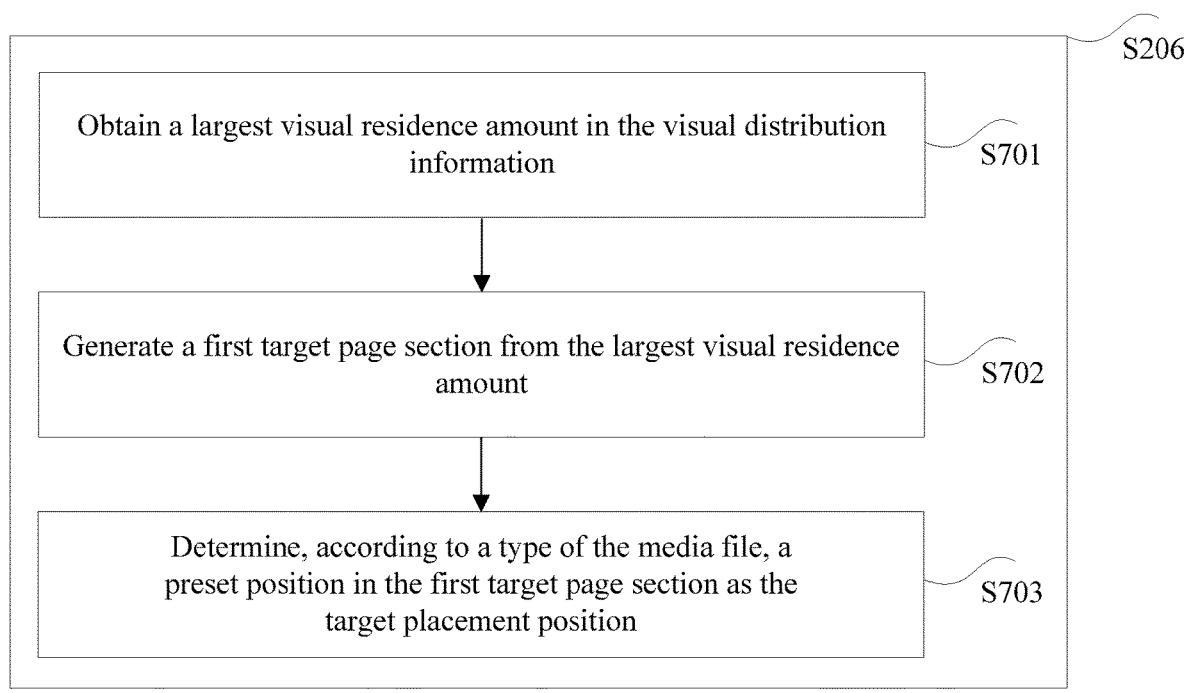
FIG. 7 is a flowchart of a method for generating a target placement position in a virtual three-dimensional space according to visual distribution information according to an embodiment.

FIG. 7 is a flowchart of a method for generating a target placement position in a virtual three-dimensional space according to visual distribution information according to an embodiment. As shown in FIG. 7, the method includes operations S701 to S703:

Operation S701: Obtain a largest visual residence amount in the visual distribution information.

In the technical solution provided by operation S701 of the disclosure, the visual distribution information is generated from the visual residence amount of each point, after the visual distribution information of the target object in the virtual three-dimensional space is obtained according to the first position information, a largest visual residence amount in the visual distribution information is obtained, and the largest visual residence amount is obtained by performing normalization processing on a largest visual residence time according to the residence time of the target object in the virtual three-dimensional space.

Operation S702: Generate a first target page section from the largest visual residence amount.

In the technical solution provided by operation S702 of the disclosure, the first target page section is generated from the largest visual residence amount. In an example embodiment, an area of the first target page section is greater than or equal to a size of an area corresponding to the largest visual residence amount, to improve visual experience of the user. However, a relationship between the area of the first target page section and the size of the area corresponding to the largest visual residence amount is not limited herein.

After the largest visual residence amount in the visual distribution information is obtained, a first target page section capable of covering the area corresponding to the largest visual residence amount is calculated according to the largest visual residence amount. A value of the first target page section is adjustable, and the first target page section may have a flat surface or a curved surface. This is not limited herein.

Operation S703: Determine, according to a type of the media file, a preset position in the first target page section as the target placement position.

In the technical solution provided by operation S703 of the disclosure, after the first target page section is generated from the largest visual residence amount, the preset position in the first target page section is determined as the target placement position according to the type of the media file. The type of the media file may include a main text media file and a sidebar media file. The main text media file may be a media file that disappears after being played for a period of time or a resident media file, the placement position of the media file is a sub-page section having a largest visual residence amount in the first page section. In an example embodiment, an area of the sub-page section is smaller than an area of the first target page section. However, a relationship between the area of the sub-page section and the area of the first target page section cannot be limited herein. The sidebar media file may be a media file played next to a main text media file. A position of the media file may be a sub-page section apart from a side edge of the first target page section by a distance. In an example embodiment, an area of the sub-page section is smaller than an area of the first target page section.

In this embodiment, a largest visual residence amount in the visual distribution information is obtained; a first target page section is generated from the largest visual residence amount; and a preset position in the first target page section is determined as the target placement position according to a type of the media file. The target placement position in the virtual three-dimensional space is generated according to the visual distribution information. Further, the media file is placed at the target placement position in the virtual three-dimensional space, thereby improving media file placement efficiency.

In an optional implementation, operation S703 of determining, according to a type of the media file, a preset position in the first target page section as the target placement position includes: determining a second target page section corresponding to the largest visual residence amount in the first target page section as the target placement position when the media file is a main text media file; and determining a third target page section apart from a side edge of the first target page section by a preset distance as the target placement position when the media file is a sidebar media file.

Figure 8:
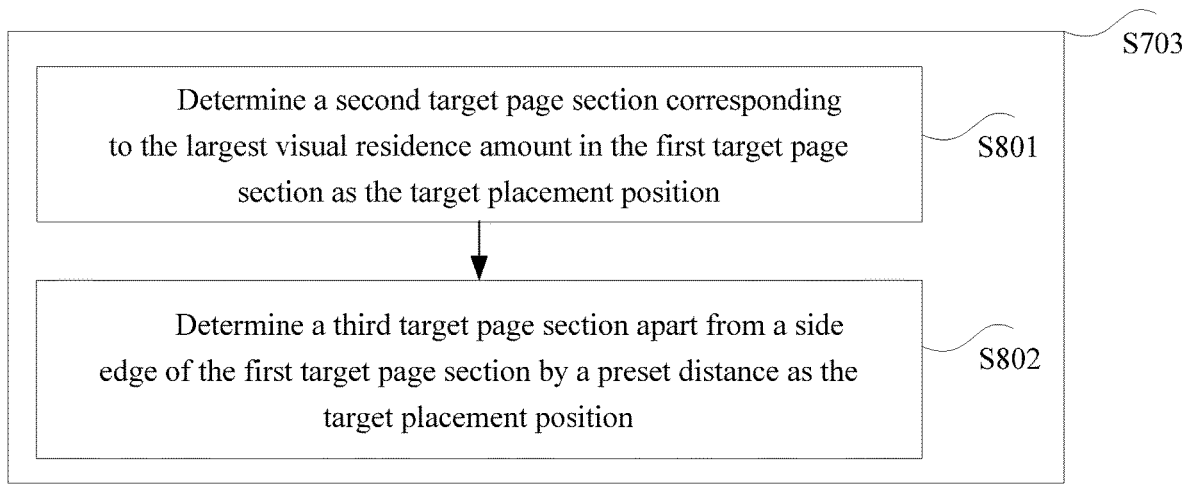
FIG. 8 is a flowchart of a method for determining a preset position in a first target page section as a target placement position according to a type of a media file according to an embodiment.

FIG. 8 is a flowchart of a method for determining a preset position in a first target page section as a target placement position according to a type of a media file according to an embodiment. As shown in FIG. 8, the method includes operations S801-S802:

Operation S801: Determine a second target page section corresponding to the largest visual residence amount in the first target page section as the target placement position.

In the technical solution provided by operation S801 of the disclosure, the second target page section corresponding to the largest visual residence amount in the first target page section is determined as the target placement position when the media file is a main text media file.

In an example embodiment, an area of the second target page section is smaller than an area of the first target page section, to improve visual experience of the user. However, a relationship between the area of the second target page section and the area of the first target page section is not limited.

Operation S802: Determine a third target page section apart from a side edge of the first target page section by a preset distance as the target placement position.

In the technical solution provided by operation S802 of the disclosure, the third target page section apart from the side edge of the first target page section by the preset distance is determined as the target placement position when the media file is a sidebar media file. In an example embodiment, an area of the third target page section is smaller than an area of the first target page section, to improve visual experience of the user. However, a relationship between the area of the third target page section and the area of the first target page section is not limited.

For a sidebar media file, the third target page section may be apart from an upper side, a lower side, a left side, or a right side of the first target page section by a distance (e.g., preset distance). A value of the preset distance is adjustable, and is not limited therein, thereby improving variety of the target placement position.

In this embodiment, a second target page section corresponding to the largest visual residence amount in the first target page section is determined as the target placement position when the media file is a main text media file; and a third target page section apart from a side edge of the first target page section by a preset distance is determined as the target placement position when the media file is a sidebar media file. The preset position in the first target page section is determined as the target placement position according to the type of the media file. Further, the media file is automatically placed at the target placement position in the virtual three-dimensional space, thereby improving media file placement efficiency. Also, the problem of a need for manually determining a target placement position in the related art can be solved.

In an optional implementation, before the media file is placed at the target placement position in the virtual three-dimensional space, the media file is determined according to first behavioral characteristic data of the target object in the virtual three-dimensional space and/or second behavioral characteristic data of the target object outside the virtual three-dimensional space.

Figure 9:
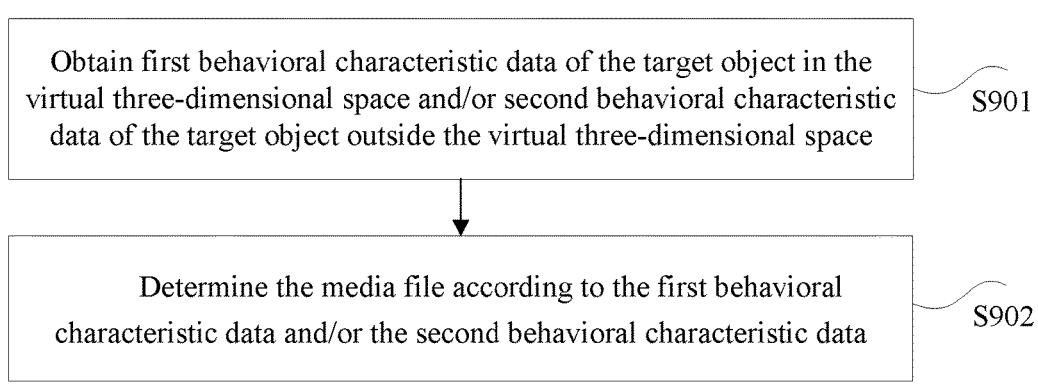
FIG. 9 is a flowchart of another method for placing a media file according to an embodiment.

FIG. 9 is a flowchart of another method for placing a media file according to an embodiment. As shown in FIG. 9, the method includes operations S901-S902:

Operation S901: Obtain first behavioral characteristic data of the target object in the virtual three-dimensional space and/or second behavioral characteristic data of the target object outside the virtual three-dimensional space.

In the technical solution provided by operation S901 of the disclosure, before the media file is placed at the target placement position in the virtual three-dimensional space, personalized recommendation may be performed on the media file. When the first behavioral characteristic data of the target object in the virtual three-dimensional space is obtained, an interest tag of the target object is imported. Statistics about first behavioral characteristic data of the target object capable of reflecting an interest characteristic of the target object in VR are collected, to obtain the interest tag of the target object, where the interest tag includes a personal image selection, a prop operation, an environment selection, and the like.

Before the media file is placed at the target placement position in the virtual three-dimensional space, alternatively, the second behavioral characteristic data of the target object outside the virtual three-dimensional space is obtained. The target object may log in to a VR application by using an existing account. For example, the account is a shopping account, a social account, or the like. Associated information in the account is imported. The associated information includes an existing interest tag. The interest tag includes information such as interest of the target object in photography and the target object being a high income individual.

Operation S902: Determine the media file according to the first behavioral characteristic data and/or the second behavioral characteristic data.

In the technical solution provided by operation S902 of the disclosure, when the first behavioral characteristic data of the target object in the virtual three-dimensional space is obtained, statistics about the first behavioral characteristic data of the target object are collected. For example, statistics about behavioral characteristic data for setting an image of the target object are collected, and statistics about behavioral characteristic data, such as a time of using a prop, a time length of using a prop, and how to use a prop, are collected. The media file is determined according to the first behavioral characteristic data.

When the second behavioral characteristic data of the target object outside the virtual three-dimensional space is obtained, statistical processing is performed on the second behavioral characteristic data of the target object, to obtain an interest graph of the target object. Data information about which statistics may be collected includes behaviors such as a historical browsing behavior, a photograph publishing behavior, a text publishing behavior, a commodity purchasing behavior, and a historical position of residence of the target object.

Optionally, target behavioral characteristic data is obtained according to the first behavioral characteristic data, a first parameter corresponding to the first behavioral characteristic data, the second behavioral characteristic data, and a second parameter corresponding to the second behavioral characteristic data, where the first behavioral characteristic data and the second behavioral characteristic data are different behavioral characteristic data of a same characteristic behavior, for example, the first behavioral characteristic data and the second behavioral characteristic data are opposite behavioral characteristic data of a same characteristic behavior, and a direction in which a value of the first parameter changes with time is opposite to a direction in which a value the second parameter changes with time. For example, if the first parameter is a number ranging from 0 to 1, and the second parameter is (1−the first parameter), as the time changes, a value of the first parameter is increased, that is, a proportion of the behavioral characteristic data occupied by the first behavioral characteristic data is increased over time, and a value of the second parameter is decreased, that is, a proportion of the behavioral characteristic data occupied by the second behavioral characteristic data is descried over time until the value of the second parameter is 0. Finally, the media file is determined from the target behavioral characteristic data determined according to the first behavioral characteristic data, the first parameter, the second behavioral characteristic data, and the second parameter.

Optionally, the first behavioral characteristic data and the second behavioral characteristic data are combined, and an interest tag outside the virtual three-dimensional space and an interest tag in the virtual three-dimensional space are combined to obtain an interest characteristic of the target object. Optionally, the interest characteristic of the target object may be obtained by using the formula: the first behavioral characteristic data*α+the second behavioral characteristic data*(1−α), where α is used for representing the first parameter, and (1−α) is used for representing the second parameter. For a same point of interest, the first behavioral characteristic data and the second behavioral characteristic data are different behavioral characteristic data. In an example embodiment, the first behavioral characteristic data and the second behavioral characteristic data are opposite behavioral characteristic data. A proportion of the behavioral characteristic data of the target object occupied by the first behavioral characteristic data in the virtual three-dimensional space is increased over time, and a proportion of the behavioral characteristic data of the target object occupied by the second behavioral characteristic data outside the virtual three-dimensional space is decreased over time is decreased over time until the proportion is 0. α is a number ranging from 0 and 1, and α is decreased as a time of the target object in the virtual three-dimensional space is increased.

For example, outside the virtual three-dimensional space, the target object is not interested in painting, and a second parameter (1−α) corresponding to expressed second behavioral characteristic data is small. However, in the virtual three-dimensional space, because of a good painting effect in the virtual three-dimensional space, the target object is particularly interested in painting over time, and the first parameter a corresponding to the expressed first behavioral characteristic data is increased. A media file related to the interest graph is recommended according to the interest characteristic of the target object, and further, the media file is placed at the target placement position in the virtual three-dimensional space, thereby achieving personalized recommendation of the media file.

It should be noted that the first behavioral characteristic data and the second behavioral characteristic data being opposite behavioral characteristic data is merely an example implementation in this embodiment, and it is not limited to the first behavioral characteristic data and the second behavioral characteristic data merely being opposite behavioral characteristic data in this embodiment. The foregoing method can be used provided that the first behavioral characteristic data and the second behavioral characteristic data are different behavioral characteristic data of a same characteristic behavior. Examples are not provided herein again to avoid repetitive description. In this embodiment before a media file is placed at the target placement position in the virtual three-dimensional space, first behavioral characteristic data of the target object in the virtual three-dimensional space and/or second behavioral characteristic data of the target object outside the virtual three-dimensional space are or is obtained; and the media file is determined according to the first behavioral characteristic data and/or the second behavioral characteristic data. Further, the media file is placed at the target placement position in the virtual three-dimensional space, thereby achieving personalized recommendation of the media file.

In an optional implementation, operation S901 of obtaining the second behavioral characteristic data of the target object outside the virtual three-dimensional space includes: obtaining identification information associated with a login account used by the target object to log in to a VR application; and determining the media file according to the identification information.

Figure 10:
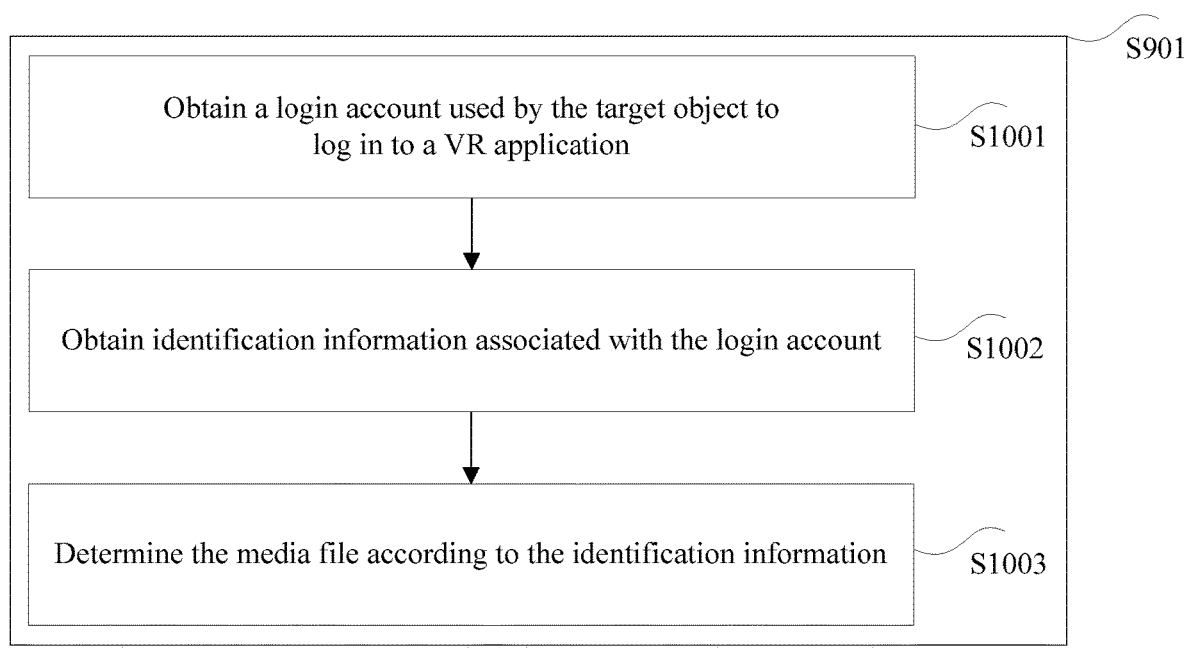
FIG. 10 is a flowchart of a method for obtaining second behavioral characteristic data of a target object outside a virtual three-dimensional space according to an embodiment.

FIG. 10 is a flowchart of a method for obtaining second behavioral characteristic data of a target object outside a virtual three-dimensional space according to an embodiment. As shown in FIG. 10, the method includes operations S1001-S1003:

Operation S1001: Obtain a login account used by the target object to log in to a VR application.

In the technical solution provided by operation S1001 of the disclosure, the target object enters the virtual three-dimensional space through the VR application.

The login account used by the target object to log in to the VR application may be a shopping account or a social account. The target object logs in to the VR application by using a shopping account or a social account to enter the virtual three-dimensional space through the VR application.

Operation S1002: Obtain identification information associated with the login account.

In the technical solution provided by operation S1002 of the disclosure, the login account has associated identification information. The identification information includes an existing interest tag of the target object, for example, a tag indicating that the target object likes photography. After the login account used by the target object to log in to the VR application is obtained, the identification information associated with the login account is imported.

Operation S1003: Determine the media file according to the identification information.

In the technical solution provided by operation S1003 of the disclosure, after the identification information associated with the login account is obtained, the media file is determined according to the identification information.

Optionally, statistical processing is performed on the behavioral characteristic data of the target object, to obtain an interest graph of the target object. Data information about which statistics may be collected includes a historical browsing behavior, a photograph publishing behavior, a text publishing behavior, and a commodity purchasing behavior of the target object and the like. A media file related to the interest graph of the target object is recommended according to the interest graph of the target object, and further, the media file is placed at the target placement position in the virtual three-dimensional space.

In this embodiment, a login account used by the target object to log in to a VR application is obtained, where the target object enters the virtual three-dimensional space through the VR application; identification information associated with the login account is obtained; and the media file is determined according to the identification information. The second behavioral characteristic data of the target object outside the virtual three-dimensional space is obtained. Further, the media file is placed at the target placement position in the virtual three-dimensional space, thereby improving media file placement efficiency. The technical solutions of the disclosure are described below with reference to an example embodiment, and the method for placing a media file of the example embodiment may be performed by a VR system. The VR system includes: an HMD with an eye tracking function, a screen in the HMD, an eye tracking module in the HMD, a tracking system, and a calculation processing unit.

The screen in the HMD is configured to display a real-time picture in a VR scene.

The eye tracking module in the HMD is configured to obtain a real-time moving track of an eye of a target object and an eye direction of the target object.

The tracking system is configured to track position information and motion information of the target object in a real three-dimensional space.

The calculation processing unit is configured to obtain real-time position and motion information of a user from the tracking system, and calculate three-dimensional coordinates of the head of the user in the virtual three-dimensional space and a visual field orientation of the user in the virtual three-dimensional space.

Figure 11:
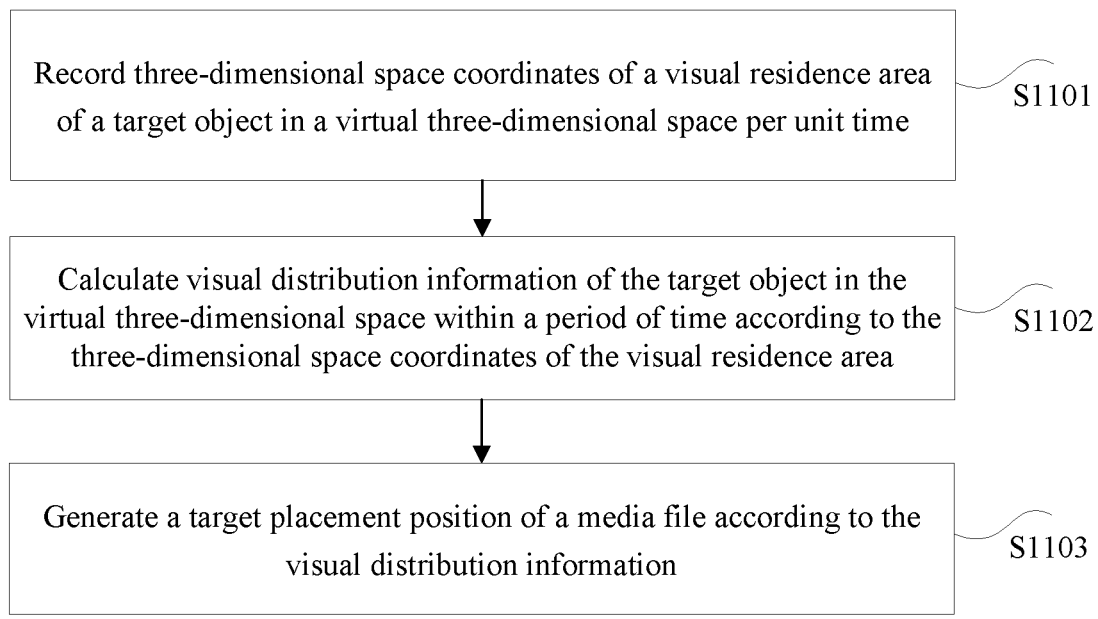
FIG. 11 is a flowchart of another method for placing a media file according to an embodiment.

FIG. 11 is a flowchart of another method for placing a media file according to an embodiment. As shown in FIG. 11, the method includes operations S1101-S1103:

Operation S1101: Record three-dimensional space coordinates of a visual residence area of a target object in a virtual three-dimensional space per unit time.

Operation S1102: Calculate visual distribution information of the target object in the virtual three-dimensional space within a period of time according to the three-dimensional space coordinates of the visual residence area.

Operation S1103: Generate a target placement position of a media file according to the visual distribution information.

Operation S1101 of recording three-dimensional space coordinates of a visual residence area of a target object in a virtual three-dimensional space per unit time is described in detail below.

Figure 12:
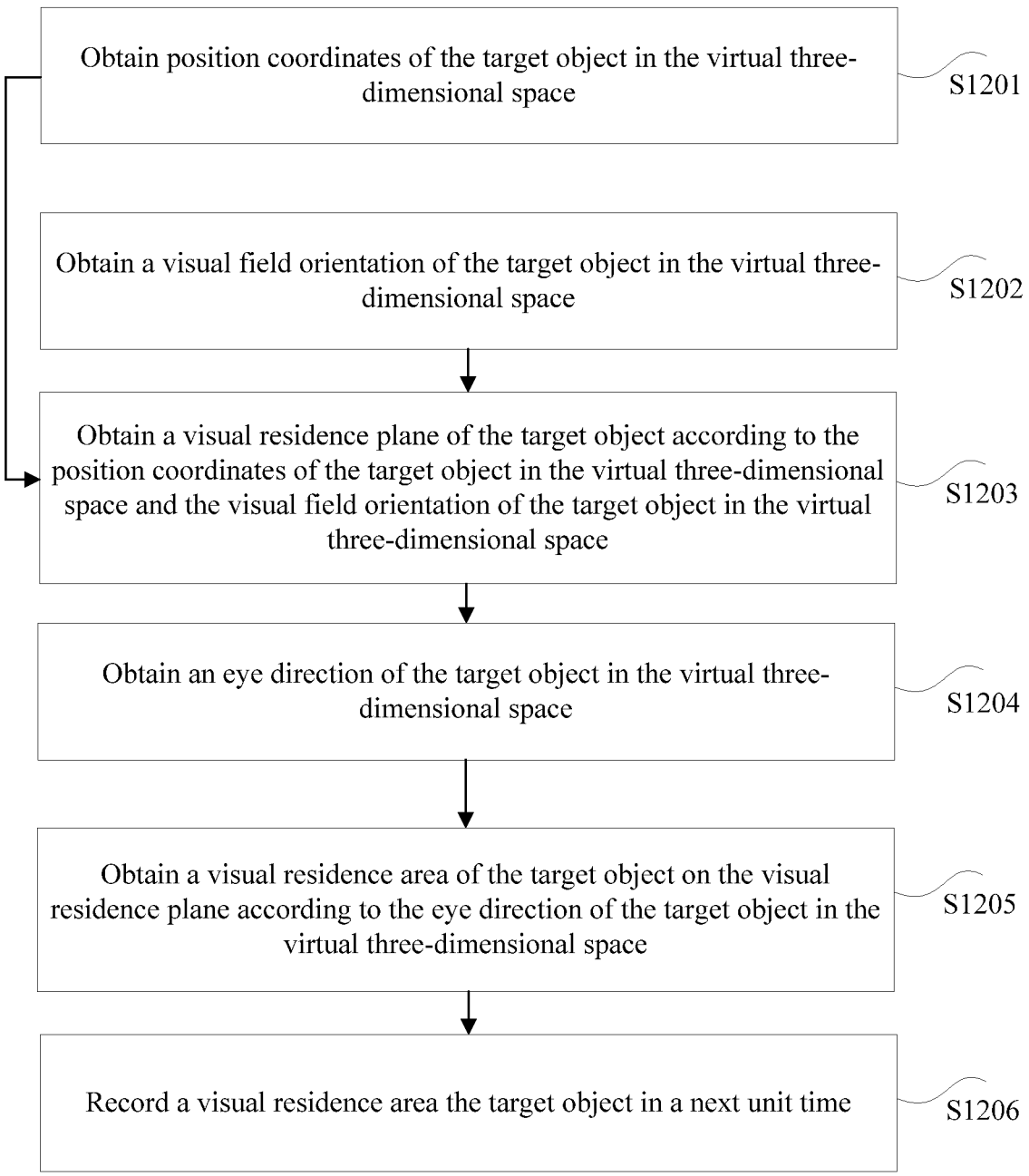
FIG. 12 is a flowchart of a method for obtaining a visual residence area of a target object in a virtual three-dimensional space per unit time according to an embodiment.

FIG. 12 is a flowchart of a method for obtaining a visual retention area of a target object in a virtual three-dimensional space per unit time according to an embodiment. As shown in FIG. 12, the method includes operations S1201-S1206:

Operation S1201: Obtain position coordinates of the target object in the virtual three-dimensional space.

Position coordinates (x, y, z) of the target object in the virtual three-dimensional space are obtained, and position coordinates (x, y, z) of the head of a user in the virtual three-dimensional space at a current time point may be obtained through the VR system.

Operation S1202: Obtain a visual field orientation of the target object in the virtual three-dimensional space.

A visual field orientation (α, β, γ) of the target object in the virtual three-dimensional space is obtained. A visual field orientation (α, β, γ) of the head of the user is obtained while a current time point and a current position are obtained.

Operation S1203: Obtain a visual residence plane of the target object according to the position coordinates of the target object in the virtual three-dimensional space and the visual field orientation of the target object in the virtual three-dimensional space.

After the position coordinates of the target object in the virtual three-dimensional space are obtained, and the visual field orientation of the target object in the virtual three-dimensional space is obtained, the visual residence plane of the target object may be obtained based on a series of basic parameters, the position (x, y, z) of the head of the user, and the visual field orientation (α, β, γ). Alternatively, the visual residence plane of the target object, a width and a length of the plane, and three-dimensional space coordinates of each point on the plane may be obtained based on a series of basic parameters, the position (x, y, z) of the head of the user, and the visual field orientation (α, β, γ). The foregoing basic parameters are provided by a developer. If the developer does not provide the basic parameters, the basic parameters the preset parameter may be calculated based on empirical data. For example, the empirical data is an optimal visual range of 2.5 m, or may be an FOV of 90°. Specific data does not affect calculation methods.

Figure 13A:
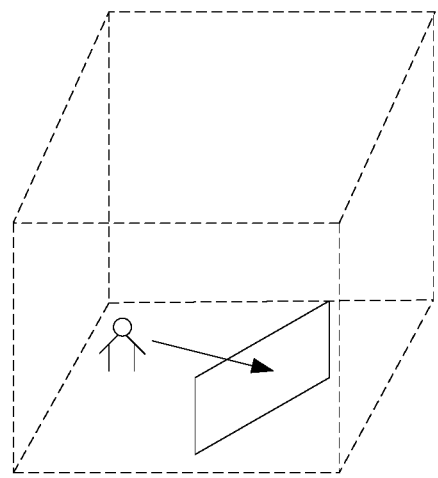
FIG. 13a is a schematic diagram of a visual residence plane of a virtual three-dimensional space according to an embodiment.

FIG. 13a is a schematic diagram of a visual residence plane of a virtual three-dimensional space according to an embodiment. As shown in FIG. 13a, the target object is located in the virtual three-dimensional space and an eye of the target object is directed toward the visual residence plane. The visual residence plane of the target object is obtained according to the position coordinates of the target object in the virtual three-dimensional space and the visual field orientation of the target object in the virtual three-dimensional space. The visual residence plane is shown as rectangular, but the disclosure is not limited thereto.

Figure 13B:
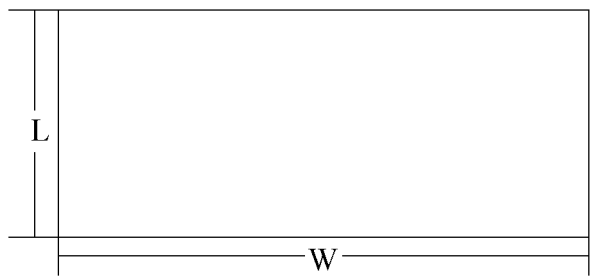
FIG. 13b is a schematic diagram of a visual residence plane of another virtual three-dimensional space according to an embodiment.

FIG. 13b is a schematic diagram of a visual retention plane of another virtual three-dimensional space according to an embodiment. As shown in FIG. 13b, a length of the visual residence plane is L, and a width thereof is W. The length and the width of the visual residence plane may be obtained from empirical data, such as an optimal visual range d (empirical data is 2.5 m) and an FOV (empirical data is 90°), based on the position (x, y, z) of the head of the user and the visual field orientation (α, β, γ).

Operation S1204: Obtain an eye direction of the target object in the virtual three-dimensional space.

An eye direction (1, θ, φ) of the target object in the virtual three-dimensional space is obtained. A direction (1, θ, φ) of an eye of the user at a current time point is obtained through the eye tracking device on the HMD.

Operation S1205: Obtain a visual residence area of the target object on the visual residence plane according to the eye direction of the target object in the virtual three-dimensional space.

Figure 14:
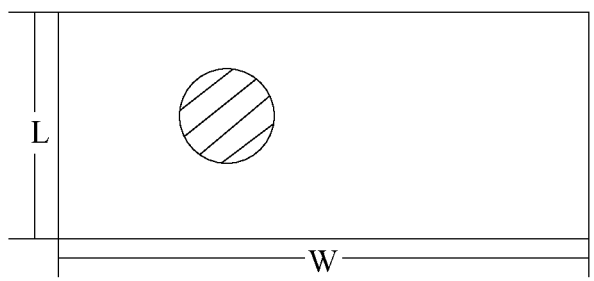
FIG. 14 is a schematic diagram of a visual residence area of a target object on a visual residence plane according to an embodiment.

The visual residence area of the user on the visual residence plane, shown as a shaded area in FIG. 14, is obtained based on the user eye direction (1, θ, φ) and a parameter of a size of a high-definition visual area of a human eye. A parameter of a size of a visual area may be provided by a developer. If the developer does not provide the parameter, the parameter may be calculated based on empirical data. For example, empirical data of a size of a visual area is 1° to 2°. Specific data does not affect a calculation method. FIG. 14 is a schematic diagram of a visual residence area of a target object on a visual residence plane according to an embodiment. A length of the visual residence plane is L, and a width thereof is W. After the visual residence area of the target object on the visual residence plane is determined according to the eye direction of the target object in the virtual three-dimensional space, three-dimensional space coordinates of each point in the visual residence area of the user are recorded.

Operation S1206: Record a visual residence area the target object in a next unit time.

After the visual residence area of the target object on the visual residence plane is determined according to the eye direction of the target object in the virtual three-dimensional space, a visual residence plane is recalculated in the next unit time, to obtain a new visual residence plane, three-dimensional coordinates of each point in the visual residence area of the user in the new visual residence plane are obtained, and operations are repeated until the user leaves the three-dimensional space. In addition, a residence time of the user in the three-dimensional space is recorded.

The visual residence area of the user on the visual residence plane is obtained based on the user eye direction (1, θ, φ) and a parameter of a size of a high-definition visual area of a human eye, and three-dimensional space coordinates of each point in the visual residence area of the user are recorded.

Operation S1102 of calculating visual distribution information of the target object in the virtual three-dimensional space within a period of time according to the three-dimensional space coordinates of the visual residence area is described below.

A visual residence time of a point corresponding to three-dimensional space coordinates in the visual residence area is obtained. That is, a visual residence time of a coordinate point in the visual residence area is obtained. A visual residence time corresponding to a coordinate point having no visual residence is zero. A normalized visual residence amount of each coordinate point is calculated, and a visual distribution information of the user in the three-dimensional space is obtained according to the normalized visual residence amount. Optionally, a normalized visual residence amount of each coordinate point is calculated according to the following formula:

Normalized visual residence amount of each coordinate point=Residence time of each coordinate point/Residence time of a user in a three-dimensional space.

That is, a normalized visual residence amount of each coordinate point is calculated by dividing residence time of each coordinate point by residence time of a user in a three-dimensional space.

Optionally, the visual distribution information of the target object in the virtual three-dimensional space is represented by a schematic visual distribution diagram. Visual residence amounts may be represented by different colors. For example, a point having a large visual residence amount in the virtual three-dimensional space is represented by red, a point having a small visual residence amount in the virtual three-dimensional space is represented by blue, and a point having a visual residence amount of zero is represented by no color.

Operation S1103 of generating a target placement position of a media file according to the visual distribution information is described in detail below.

After the visual distribution information of the target object in the virtual three-dimensional space is obtained, the target placement position is calculated according to the visual distribution information of the user. A target page section (where the target page section may be a flat surface or a curved surface) capable of covering a largest visual residence amount with a given area (where a value is adjustable, and a method is not limited) is automatically calculated according to the visual distribution information of the target object. The media file is placed in the target page section according to a type of the media file. The type of the media file includes a main text media file and a sidebar media file.

Figure 15:
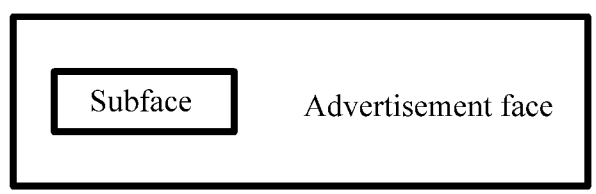
FIG. 15 is a schematic diagram of determining a target placement position according to a type of a media file according to an embodiment.

FIG. 15 is a schematic diagram of determining a target placement position according to a type of a media file according to an embodiment. As shown in FIG. 15, for a main text media file, for example, an advertisement (AD) that disappears after a period of time or a resident AD, a target placement position of the media file is a subface having a largest visual residence amount in the target page section. In an example embodiment, an area of the subface is smaller than an area of the target page section. The target page section may be an advertisement face.

Figure 16:
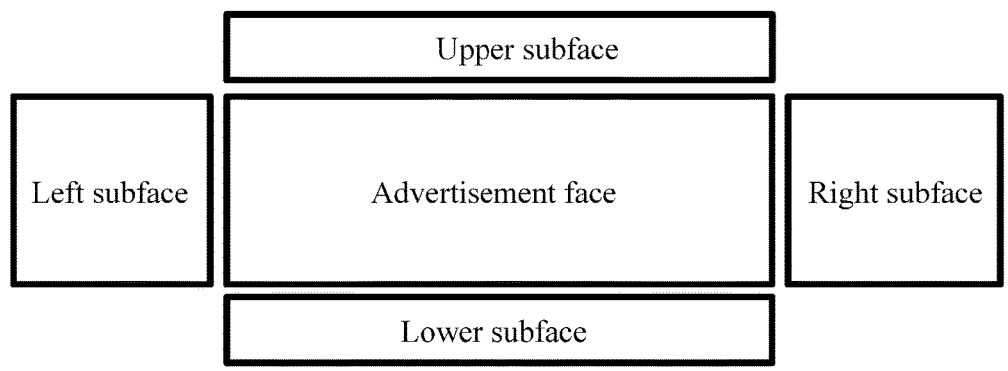
FIG. 16 is another schematic diagram of determining a target placement position according to a type of a media file according to an embodiment.

FIG. 16 is another schematic diagram of determining a target placement position according to a type of a media file according to an embodiment. As shown in FIG. 16, the media file is an AD, and the target page section is an AD face. The AD may be placed next to a main text AD, and the target placement position may be an upper subface apart from an upper side of the AD face by a distance, a lower subface apart from a lower side of the AD face by a distance, a left subface apart from a left side of the AD face by a distance, or a right subface apart from a right side of the AD face by a distance. A value of the distance is adjustable, and a method is not limited. An area of the subface may be smaller than an area of the AD face, thereby improving visual experience of the user.

Figure 17:
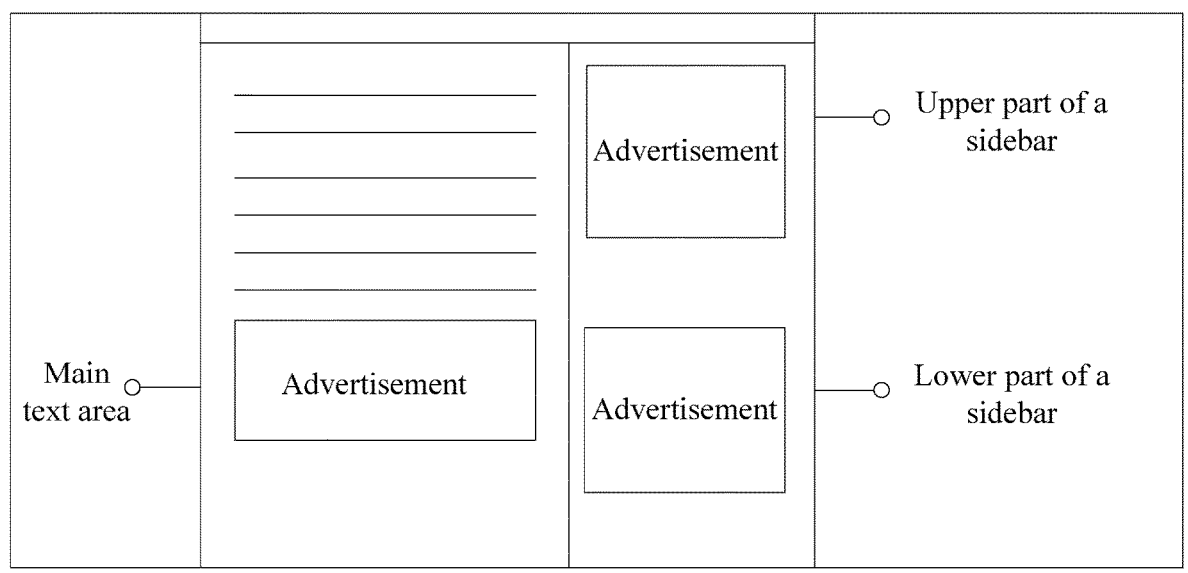
FIG. 17 is another schematic diagram of determining a target placement position according to a type of a media file according to an embodiment.

FIG. 17 is another schematic diagram of determining a target placement position according to a type of a media file according to an embodiment. As shown in FIG. 17, the media file is an AD. The AD may be placed at a position apart from "an upper part of a sidebar" of the AD face by a distance, may be placed at a position apart from "a lower part of a sidebar" of the AD face by a distance, or may be placed at a position apart from a main text area by a distance.

In this embodiment, statistics about visual hotspot diagrams of different virtual three-dimensional spaces can be collected, and an AD space is placed according to the visual hotspot diagrams, thereby improving AD placement efficiency, and reducing costs of manually placing an AD space.

Optionally, based on the foregoing technical solutions, interest graphs of the user inside VR and outside VR may be combined for performing personalized AD recommendation.

A method for obtaining an interest graph outside VR is described below.

There may be two methods for obtaining an interest graph outside VR is described below. In a first method, a user may log in to a VR world by using an existing account such as a shopping account or a social account, import an associated existing interest tag, such as interest in photography or a high income individual, in the account. In a second method, statistical processing is performed on behaviors of a user to obtain an interest graph of the user, where data information about which statistics can be collected includes a browsing history, a published photograph, published text, a type of a purchased commodity, a visited position, and the like of the user. However, the methods are merely examples and the disclosure is not limited thereto.

A method for obtaining an interest graph inside VR is described below.

In a first method, an existing interest tag of a VR user is imported. In a second method, statistics about behaviors of the user capable of reflecting an interest characteristic of user inside VR are collected, to obtain an interest tag of the user.

Optionally, collecting statistics about behaviors of the user capable of reflecting an interest characteristic of user inside VR includes collecting statistics about behaviors of selecting a personal image inside VR.

Figure 18:
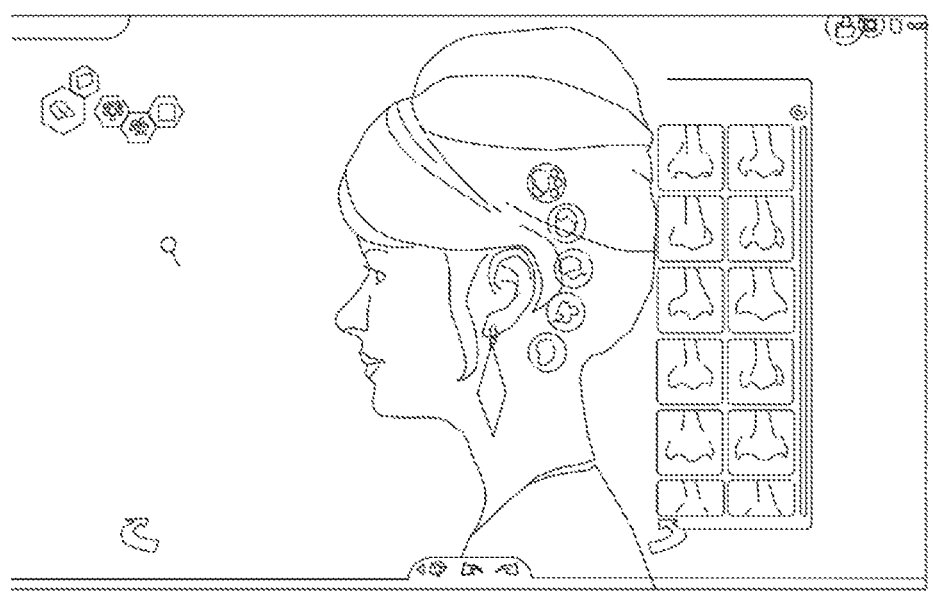
FIG. 18 is a schematic diagram of setting a personal image in a three-dimensional virtual reality (VR) application according to an embodiment.

FIG. 18 is a schematic diagram of setting a personal image in a three-dimensional VR application according to an embodiment. As shown in FIG. 18, when entering a VR world, a target object sets an image thereof. Parts that are set may include a hairstyle, a hair color, a skin color, a nose shape, a cloth style, and the like. A system records a specified number of each part of a user, and further obtains an interest characteristic of the user according to the specified number, for example, obtains an interest characteristic such as a hair color or a skin color selected by the user.

Optionally, collecting statistics about behaviors of the user capable of reflecting an interest characteristic of user inside VR includes collecting statistics about performing an operation on a prop (or referred to as an article) of the user.

The user may have many props, such as a screen, a toy, and a showcase, in a virtual world. The system records times of using the props by the user, time lengths of using the props, how to use the props (for example, which content is browsed and which games are played), appearances and styles of the props, and the like.

Optionally, collecting statistics about behaviors of the user capable of reflecting an interest characteristic of user inside VR includes collecting statistics about selection of a VR environment. In a VR system, an environment greatly affects immersive experience of a user, and the system records that the user chooses to use which environment in which period of time.

Optionally, an interest tag inside VR and an interest tag outside VR may be combined by using the following method:

Interest characteristic of a user=Interest characteristic outside VR*α+Interest characteristic inside VR*(1−α), where α is a number ranging from 0 to 1, and α is decreased as a using time of the user inside VR is increased until α is 0. That is, a proportion (1−α) of an interest characteristic occupied by an interest characteristic inside VR is increased as a using time of VR is increased, and a proportion (α) of the interest characteristic occupied by an interest characteristic outside VR is decreased as the using time of VR is decreased. For a same point of interest, the interest characteristic outside VR and the interest characteristic inside VR are different behavioral characteristic data. For example, the interest characteristic outside VR and the interest characteristic inside VR are opposite behavioral characteristic data. An effect of presenting a point of interest of a target object inside VR is better than an effect of presenting a point of interest of a target object outside VR. A proportion occupied by the interest characteristic inside VR in the behavioral characteristic data of the target object is increased over time, and a proportion occupied by the interest characteristic outside VR in the behavioral characteristic data of the target object is decreased over time.

It should be noted that the interest characteristic inside VR and the interest characteristic outside VR being opposite behavioral characteristic data is merely an example implementation in this embodiment, and it is not limited to the interest characteristic inside VR and the interest characteristic outside VR merely being opposite interest characteristics in this embodiment. The foregoing method can be used provided that the interest characteristic inside VR and the interest characteristic outside VR are different behavioral characteristic data of a same point of interest. Examples are not provided herein again one by one.

It should be noted that, for ease of description, the foregoing method embodiments are described as a series of action combinations. However, a person skilled in the art should understand that the disclosure is not limited to the described sequence of the actions, because some operations may be performed in another sequence or performed at the same time according to the disclosure. In addition, a person skilled in the art should also know that all the embodiments described in this specification are merely example embodiments, and the related actions and modules are not necessarily required in the disclosure.

Through the descriptions of the example embodiments, a person skilled in the art may understand that the methods according to the example embodiments may be implemented by hardware only or by software and a necessary universal hardware platform. However, an embodiment that employs software and a corresponding universal hardware platform may be widely adopted. Based on such an understanding, the technical solutions of the embodiments essentially, or the part contributing to the related technology may be implemented in a form of a software product. The computer software product is stored in a storage medium (such as a ROM/RAM, a magnetic disk, or a compact disc) and includes several instructions for instructing a VR device, a server, a network device, or the like to perform the methods described in the embodiments.

According to another aspect of the embodiments, an apparatus for placing a media file for performing the foregoing method for placing a media file is provided. The apparatus includes one or more processors, and one or more memories storing program units. The program units are executed by the processor, and the program units may include: a first obtaining unit, a second obtaining unit, a generation unit, and a placement unit.

Figure 19:
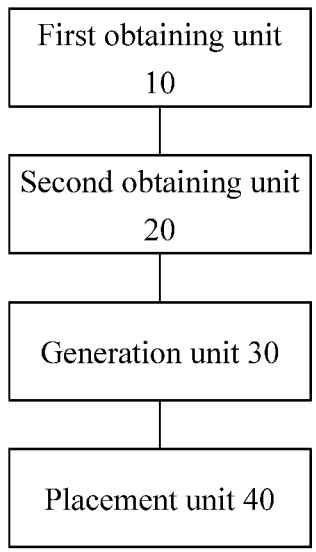
FIG. 19 is a schematic diagram of an apparatus for placing a media file according to an embodiment.

FIG. 19 is a schematic diagram of an apparatus for placing a media file according to an embodiment. As shown in FIG. 19, the apparatus may include: a first obtaining unit 10, a second obtaining unit 20, a generation unit 30, and a placement unit 40.

The first obtaining unit 10 is configured to obtain first position information of a visual residence area of a target object in a virtual three-dimensional space within each first preset time period.

The second obtaining unit 20 is configured to obtain visual distribution information of the target object in the virtual three-dimensional space according to the first position information within a second preset time period, the second preset time period including the first preset time period.

The generation unit 30 is configured to generate a target placement position in the virtual three-dimensional space according to the visual distribution information.

The placement unit 40 is configured to place a media file at the target placement position in the virtual three-dimensional space.

It should be noted that the first obtaining unit 10, the second obtaining unit 20, the generation unit 30, and the placement unit 40 may operate in a terminal as a part of the apparatus. Functions implemented by the foregoing units may be implemented by a processor in the terminal. The terminal may be a smartphone (such as an Android mobile phone or an iOS mobile phone), a tablet computer, a handheld computer, or a terminal device such as a mobile Internet device (MID) or a PAD.

Figure 20:
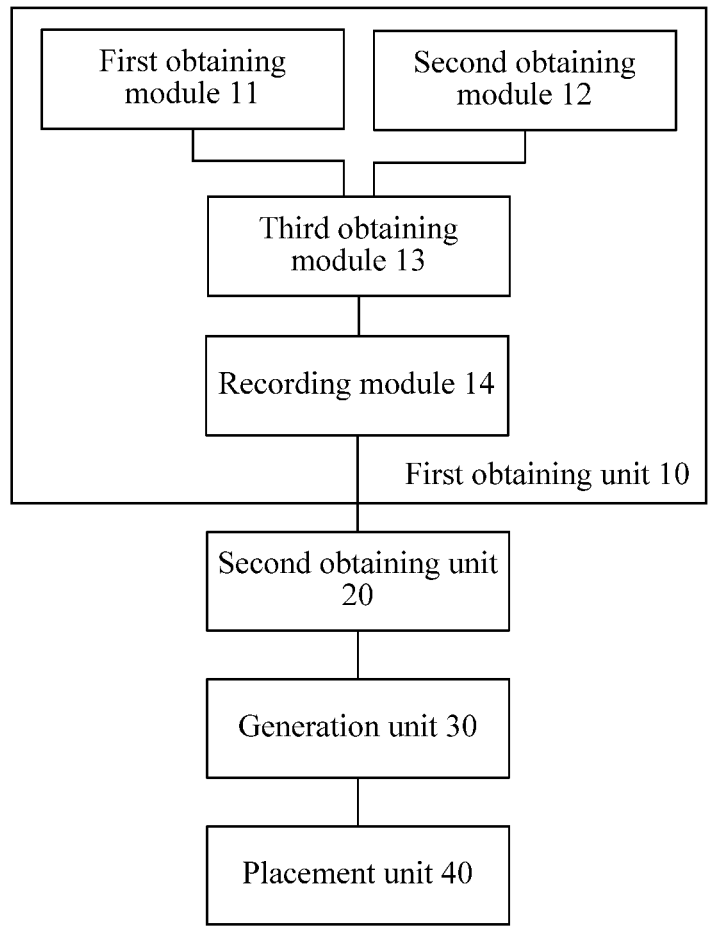
FIG. 20 is a schematic diagram of another apparatus for placing a media file according to an embodiment.

FIG. 20 is a schematic diagram of another apparatus for placing a media file according to an embodiment. As shown in FIG. 20, the apparatus may include: a first obtaining unit 10, a second obtaining unit 20, a generation unit 30, and a placement unit 40. The first obtaining unit 10 includes: a first obtaining module 11, a second obtaining module 12, a third obtaining module 13, and a recording module 14.

It should be noted that functions of the first obtaining unit 10, the second obtaining unit 20, the generation unit 30, and the placement unit 40 in this embodiment may be the same or similar to those in the apparatus for placing a media file in the embodiment shown in FIG. 19. Details are not described herein again.

The first obtaining module 11 is configured to obtain a first visual residence plane of the target object in the virtual three-dimensional space within the first preset time period.

The second obtaining module 12 is configured to obtain a first moving track of an eye of the target object within the first preset time period.

The third obtaining module 13 is configured to obtain the visual residence area on the first visual residence plane according to the first moving track and a preset visual range, where the preset visual range is a range of a visual area in which the visual area has a preset definition or higher when the target object views the visual area in the three-dimensional space.

The recording module 14 is configured to record the first position information of the visual residence area on the first visual residence plane in the virtual three-dimensional space.

It should be noted that the first obtaining module 11, the second obtaining module 12, the third obtaining module 13, and the recording module 14 may operate in a terminal as a part of the apparatus. Functions implemented by the foregoing modules may be implemented by a processor in the terminal.

Figure 21:
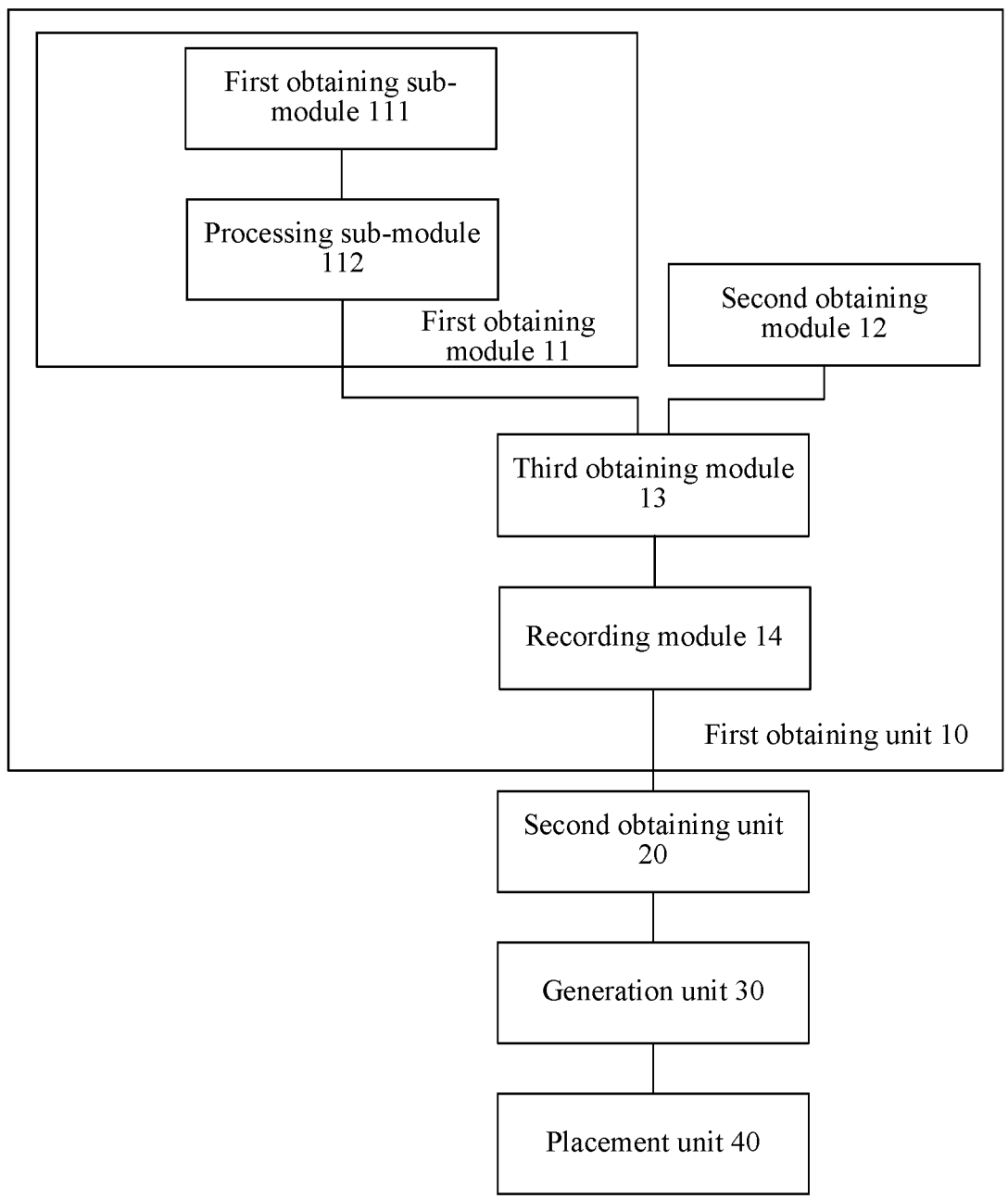
FIG. 21 is a schematic diagram of another apparatus for placing a media file according to an embodiment.

FIG. 21 is a schematic diagram of another apparatus for placing a media file according to an embodiment. As shown in FIG. 21, the apparatus may include: a first obtaining unit 10, a second obtaining unit 20, a generation unit 30, and a placement unit 40. The first obtaining unit 10 includes: a first obtaining module 11, a second obtaining module 12, a third obtaining module 13, and a recording module 14. The first obtaining module 11 includes: a first obtaining sub-module 111 and a processing sub-module 112.

It should be noted that functions of the first obtaining unit 10, the second obtaining unit 20, the generation unit 30, the placement unit 40, the first obtaining module 11, the second obtaining module 12, the third obtaining module 13, and the recording module 14 in this embodiment may be the same or similar to those in the apparatus for placing a media file in the embodiment shown in FIG. 20. Details are not described herein again.

The first obtaining sub-module 111 is configure to obtain second position information of the head of the target object in the virtual three-dimensional space and visual field orientation information of the target object, where the visual field orientation information is used for indicating an orientation of a visual field of the target object in the virtual three-dimensional space.

The processing sub-module 112 is configured to process the second position information and the visual field orientation information according to a preset parameter, to obtain the first visual residence plane of the target object in the virtual three-dimensional space.

It should be noted that the first obtaining sub-module 111 and the processing sub-module 112 may operate in a terminal as a part of the apparatus. Functions implemented by the foregoing sub-modules may be implemented by a processor in the terminal.

Figure 22:
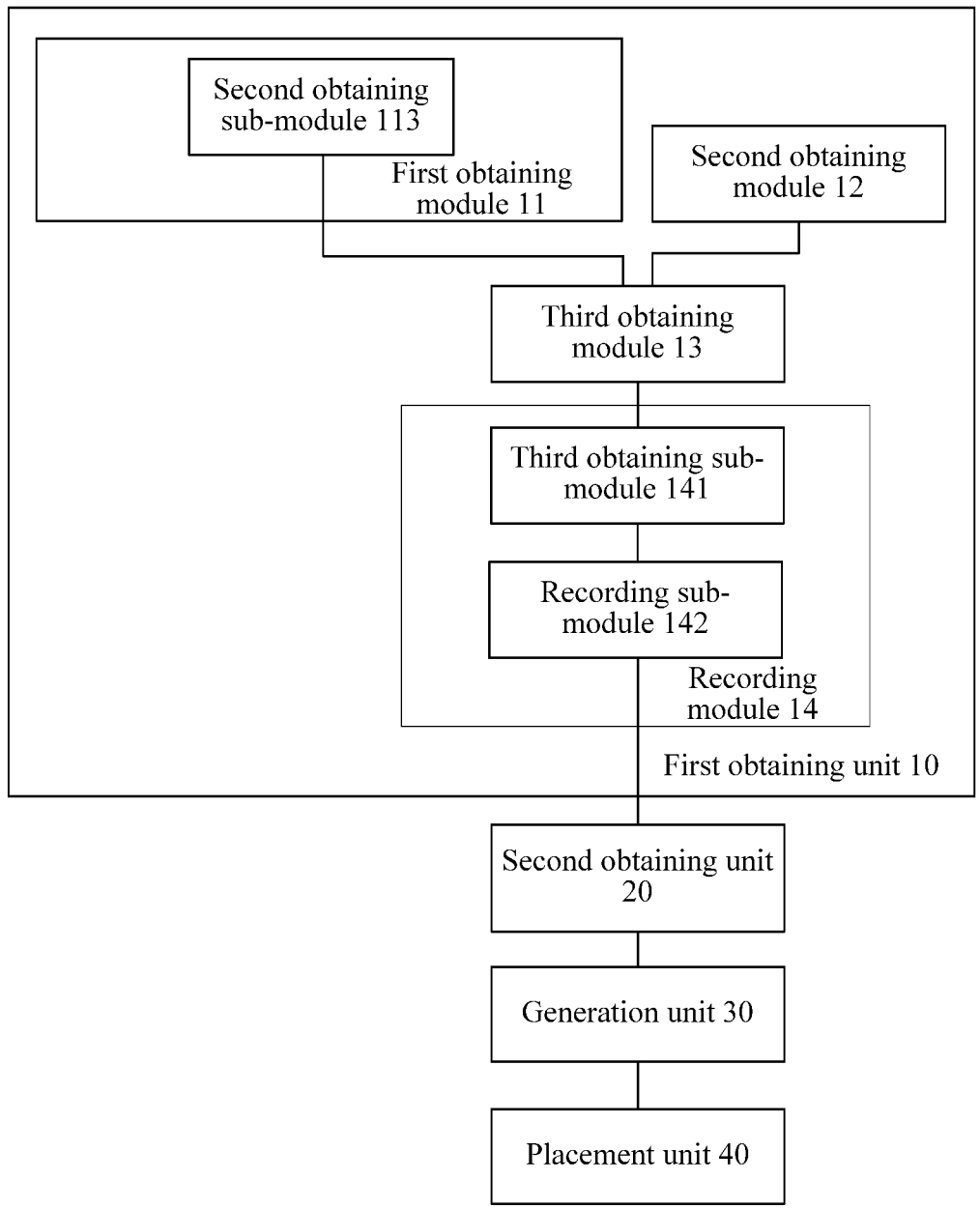
FIG. 22 is a schematic diagram of another apparatus for placing a media file according to an embodiment.

FIG. 22 is a schematic diagram of another apparatus for placing a media file according to an embodiment. As shown in FIG. 22, the apparatus may include: a first obtaining unit 10, a second obtaining unit 20, a generation unit 30, and a placement unit 40. The first obtaining unit 10 includes: a first obtaining module 11, a second obtaining module 12, a third obtaining module 13, and a recording module 14. The first obtaining module 11 includes: a second obtaining sub-module 113 and the recording module 14 includes: a third obtaining sub-module 141 and a recording sub-module 142.

It should be noted that functions of the first obtaining unit 10, the second obtaining unit 20, the generation unit 30, the placement unit 40, the first obtaining module 11, the second obtaining module 12, the third obtaining module 13, and the recording module 14 in this embodiment may be the same or similar to those in the apparatus for placing a media file in the embodiment shown in FIG. 20. Details are not described herein again.

The second obtaining sub-module 113 is configured to obtain first three-dimensional coordinates of each point in the first visual residence plane in the three-dimensional space.

The third obtaining sub-module 141 is configured to obtain, from the first three-dimensional coordinates, second three-dimensional coordinates of each point in the visual residence area on the first visual residence plane in the virtual three-dimensional space.

The recording sub-module 142 is configured to record the second three-dimensional coordinates.

It should be noted that the second obtaining sub-module 113, the third obtaining sub-module 141, and the recording sub-module 142 may operate in a terminal as a part of the apparatus. Functions implemented by the foregoing sub-modules may be implemented by a processor in the terminal.

Optionally, the apparatus for placing a media file further includes: a determining unit, a third obtaining unit, a fourth obtaining unit, a fifth obtaining unit, and a first recording unit. The determining unit is configured to, after first position information of a visual residence area in a virtual three-dimensional space is recorded, determining whether a target object leaves the virtual three-dimensional space; the third obtaining unit is configured to obtain a second visual residence plane of the target object in the virtual three-dimensional space within a first preset time period (or a next first preset time period) if it is determined that the target object does not leave the virtual three-dimensional space; the fourth obtaining unit is configured to obtain a second moving track of an eye of the target object within the first preset time period; the fifth obtaining unit is configured to obtain the visual residence area on the second visual residence plane according to the second moving track and a preset visual range; and the first recording unit is configured to record the first position information of the visual residence area on the second visual residence plane in the virtual three-dimensional space.

It should be noted that the determining unit, the third obtaining unit, the fourth obtaining unit, the fifth obtaining unit, and the first recording unit may operate in a terminal as a part of the apparatus. Functions implemented by the foregoing units may be implemented by a processor in the terminal.

Optionally, the apparatus for placing a media file further includes: a second recording the unit, configured to, after whether the target object leaves the virtual three-dimensional space is determined, record a residence time of the target object in the virtual three-dimensional space if it is determined that the target object leaves the virtual three-dimensional space.

It should be noted that the second recording unit may operate in a terminal as a part of the apparatus. Functions implemented by the foregoing unit may be implemented by a processor in the terminal.

Optionally, the second obtaining unit 20 includes: a fourth obtaining module, a processing module, and a generation module. The fourth obtaining module is configured to obtain a visual residence time of visual residence performed by the target object at each point in the first position information; the processing module is configured to perform normalization processing on the visual residence time of each point according to the residence time of the target object in the virtual three-dimensional space to obtain a visual residence amount of each point; and the generation module is configured to generate the visual distribution information from the visual residence amount of each point.

It should be noted that the fourth obtaining module, the processing module, and the generation module may operate in a terminal as a part of the apparatus. Functions implemented by the foregoing modules may be implemented by a processor in the terminal.

Optionally, the generation unit 30 includes: a fifth obtaining module and a fifth obtaining module. The fifth obtaining module is configured to obtain a largest visual residence amount in the visual distribution information and generate a first target page section from the largest visual residence amount; and the determining module is configured to determine, according to a type of the media file, a preset position in the first target page section as the target placement position.

It should be noted that the fifth obtaining module and the fifth obtaining module may operate in a terminal as a part of the apparatus. Functions implemented by the foregoing modules may be implemented by a processor in the terminal.

Optionally, the determining module includes: a first determining sub-module and a second determining sub-module. The first determining sub-module is configured to determine a second target page section corresponding to the largest visual residence amount in the first target page section as the target placement position when the media file is a main text media file; and the second determining sub-module is configured to determine a third target page section apart from a side edge of the first target page section by a preset distance as the target placement position when the media file is a sidebar media file.

It should be noted that the first determining sub-module and the second determining sub-module may operate in a terminal as a part of the apparatus. Functions implemented by the foregoing sub-modules may be implemented by a processor in the terminal.

Optionally, the apparatus for placing a media file further includes: a sixth obtaining unit and a determining unit. The sixth obtaining unit is configured to, before a media file is placed at the target placement position in the virtual three-dimensional space, obtain first behavioral characteristic data of the target object in the virtual three-dimensional space and/or second behavioral characteristic data of the target object outside the virtual three-dimensional space; and the determining unit is configured to determine the media file according to the first behavioral characteristic data and/or the second behavioral characteristic data.

Optionally, the sixth obtaining unit is configured to perform the following operations to obtain the second behavioral characteristic data of the target object outside the virtual three-dimensional space: obtaining a login account used by the target object to log in to a virtual reality application, where the target object enters the virtual three-dimensional space through the virtual reality application; obtaining identification information associated with the login account; and determining the media file according to the identification information.

It should be noted that the sixth obtaining unit and the determining unit may operate in a terminal as a part of the apparatus. Functions implemented by the foregoing units may be implemented by a processor in the terminal.

It should be noted that the first obtaining unit 10 in this embodiment can be configured to perform operation S202 in the embodiments, the second obtaining unit 20 in this embodiment can be configured to perform operation S204 in the embodiments, the generation unit 30 in this embodiment can be configured to perform operation S206 in the embodiments, and the placement unit 40 in this embodiment can be configured to perform operation S208 in the embodiments.

In this embodiment, the first obtaining unit 10 obtains first position information of a visual residence area of a target object in a virtual three-dimensional space within each first preset time period; the second obtaining unit 20 obtains visual distribution information of the target object in the virtual three-dimensional space according to the first position information within a second preset time period, the second preset time period including the first preset time period; the generation unit 30 generates a target placement position in the virtual three-dimensional space according to the visual distribution information; and the placement unit 40 places a media file at the target placement position in the virtual three-dimensional space. Because the visual distribution information is obtained according to the first position information of the visual residence area of the target object in the virtual three-dimensional space within each first preset time period, the target placement position in the virtual three-dimensional space is generated according to the visual distribution information, and further, the media file is placed at the target placement position, a problem of low media file placement efficiency resulting from manually determining a target placement position in a virtual three-dimensional space is avoided, and a media file is placed in a virtual three-dimensional space, thereby achieving a technical effect of improving media file placement efficiency and solving a technical problem of low media file placement efficiency in the related technology.

It should be noted herein that implemented examples and application scenarios of the foregoing units and modules may be the same or similar to those of the corresponding operations, but are not limited to the content disclosed by the foregoing embodiments. It should be noted that the foregoing modules can operate as a part of the apparatus in a hardware environment as shown in FIG. 1A or FIG. 1B, and can be implemented through software or hardware. The hardware environment includes a network environment.

According to another aspect of the embodiments, a VR device for performing the foregoing method for placing a media file is provided.

Figure 23:
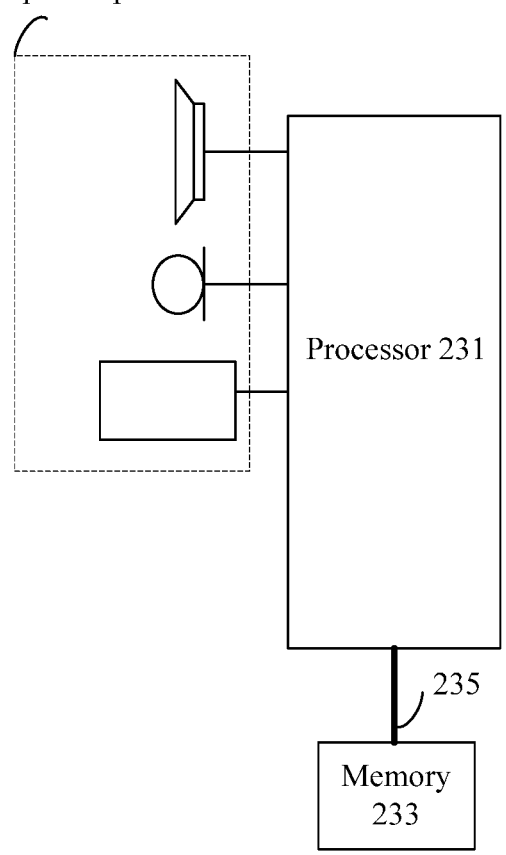
FIG. 23 is a structural block diagram of a VR device according to an embodiment.

FIG. 23 is a structural block diagram of a VR device according to an embodiment. As shown in FIG. 23, the VR device may include: one or more (only one is shown in the figure) processors 231, a memory 233, and a transmission apparatus 235. As shown in FIG. 23, the VR device may further include an input/output device 237.

The memory 233 may be configured to store a computer program and a module, for example, a program instruction/module corresponding to the method and apparatus for placing a media file in the embodiments, and the processor 231 is configured to perform various functional applications and data processing by running a software program and a module stored in the memory 233, that is, implementing the foregoing method for placing a media file. The memory 233 may include a high-speed random memory, and may alternatively include a nonvolatile memory such as one or more magnetic storage devices, a flash memory, or another nonvolatile solid-state memory. In some embodiments, the memory 233 may further include memories remotely disposed relative to the processor 231, and these remote memories may be connected to the VR device through a network. Instances of the network include, but are not limited to, the Internet, an intranet, a local area network, a mobile communications network, and a combination thereof.

The foregoing transmission apparatus 235 is configured to receive or send data through a network or may be configured to data transmission between the processor and the memory. Specific examples of the foregoing network may include a wired network and a wireless network. In an example, the transmission apparatus 235 includes a network interface controller (NIC) that may be connected to another network device and a router by using a network cable, thereby communicating with the Internet or a local area network. In an example, the transmission apparatus 235 is a radio frequency (RF) module that is configured to communicate with the Internet in a wireless manner.

Optionally, the memory 233 is configured to store an application program.

The processor 231 may invoke, by using the transmission apparatus 235, the application program stored in the memory 233, so as to perform the following operations:

obtaining first position information of a visual residence area of a target object in a virtual three-dimensional space within each first preset time period;

obtaining visual distribution information of the target object in the virtual three-dimensional space according to the first position information within a second preset time period, the second preset time period including the first preset time period;

generating a target placement position in the virtual three-dimensional space according to the visual distribution information; and placing a media file at the target placement position in the virtual three-dimensional space.

The processor 231 is further configured to perform the following operations: obtaining a first visual residence plane of the target object in the virtual three-dimensional space within the first preset time period; obtaining a first moving track of an eye of the target object within the first preset time period; obtaining the visual residence area on the first visual residence plane according to the first moving track and a preset visual range, where the preset visual range is a range of a visual area in which the visual area has a preset definition or higher when the target object views the visual area in the three-dimensional space; and recording the first position information of the visual residence area on the first visual residence plane in the virtual three-dimensional space.

The processor 231 is further configured to perform the following operations: obtaining second position information of the head of the target object in the virtual three-dimensional space and visual field orientation information of the target object, where the visual field orientation information is used for indicating an orientation of a visual field of the target object in the virtual three-dimensional space; and processing the second position information and the visual field orientation information according to a preset parameter, to obtain the first visual residence plane of the target object in the virtual three-dimensional space.

The processor 231 is further configured to perform the following operations: obtaining first three-dimensional coordinates of each point in the first visual residence plane in the three-dimensional space; obtaining, from the first three-dimensional coordinates, second three-dimensional coordinates of each point in the visual residence area on the first visual residence plane in the virtual three-dimensional space; and recording the second three-dimensional coordinates.

The processor 231 is further configured to perform the following operations: determining whether the target object leaves the virtual three-dimensional space after the first position information of the visual residence area in the virtual three-dimensional space is recorded; obtaining a second visual residence plane of the target object in the virtual three-dimensional space within the first preset time period (or the next first preset time period) if it is determined that the target object does not leave the virtual three-dimensional space; obtaining a second moving track of the eye of the target object within the first preset time period; obtaining the visual residence area on the second visual residence plane according to the second moving track and the preset visual range; and recording the first position information of the visual residence area on the second visual residence plane in the virtual three-dimensional space.

The processor 231 is further configured to perform the following operation: recording, after whether the target object leaves the virtual three-dimensional space is determined, a residence time of the target object in the virtual three-dimensional space if it is determined that the target object leaves the virtual three-dimensional space.

The processor 231 is further configured to perform the following operations: obtaining a visual residence time of visual residence performed by the target object at each point in the first position information; performing normalization processing on the visual residence time of each point according to the residence time of the target object in the virtual three-dimensional space to obtain a visual residence amount of each point; and generating the visual distribution information from the visual residence amount of each point.

The processor 231 is further configured to perform the following operations: obtaining a largest visual residence amount in the visual distribution information; generating a first target page section from the largest visual residence amount; and determining, according to a type of the media file, a preset position in the first target page section as the target placement position.

The processor 231 is further configured to perform the following operations: determining a second target page section corresponding to the largest visual residence amount in the first target page section as the target placement position when the media file is a main text media file; and determining a third target page section apart from a side edge of the first target page section by a preset distance as the target placement position when the media file is a sidebar media file.

The processor 231 is further configured to perform the following operations: obtaining first behavioral characteristic data of the target object in the virtual three-dimensional space and/or second behavioral characteristic data of the target object outside the virtual three-dimensional space; and determining the media file according to the first behavioral characteristic data and/or the second behavioral characteristic data.

The processor 231 is further configured to perform the following operations: obtaining target behavioral characteristic data according to the first behavioral characteristic data, a first parameter corresponding to the first behavioral characteristic data, the second behavioral characteristic data, and a second parameter corresponding to the second behavioral characteristic data, where the first behavioral characteristic data and the second behavioral characteristic data are different behavioral characteristic data of a same characteristic behavior, and a direction in which a value of the first parameter changes with time is opposite to a direction in which a value the second parameter changes with time; and determining the media file according to the target behavioral characteristic data.

The processor 231 is further configured to perform the following operations: obtaining a login account used by the target object to log in to a virtual reality application, where the target object enters the virtual three-dimensional space through the virtual reality application; obtaining identification information associated with the login account; and determining the media file according to the identification information.

Optionally, the foregoing input/output device 237 may be configured to output a placement result obtained by the processor 231 by placing the media file at the target placement position in the virtual three-dimensional space. For example, the input/output device 237 is configured to output a placement result of placing the media file in a page section corresponding to a largest visual residence amount in the first target page section when the media file is a main text media file, and output a placement result of placing the media file in a page section apart from a side edge of the first target page section by a preset distance when the media file is a sidebar media file.

For example, the processor 231 places an AD on an AD face according to a type of the AD. For a main text AD, for example, an AD that disappears after a period of time, the processor 231 determines a subface having a largest visual residence amount on an AD face as an AD placement position, and the input/output device 237 outputs a placement result of placing an AD on a subface having a largest visual residence amount on an AD face. For a sidebar AD, for example, an AD that is next to a main text, the processor 231 may determine a subface apart from an upper side, a lower side, a left side, or a right side of an AD face by a distance as an AD placement position, and the input/output device 237 outputs a placement result of placing an AD on a subface apart from an upper side, a lower side, a left side, or a right side of an AD face by a distance.

Optionally, the foregoing input/output device 237 may input feedback information of the foregoing placement result to the processor 231. The feedback information includes, but is not limited to, audio information, video information, and text information.

Optionally, the foregoing input/output device 237 may input first position information of a visual residence area of a target object in a virtual three-dimensional space within each first preset time period to the processor 231; input visual distribution information of the target object in the virtual three-dimensional space according to the first position information within a second preset time period, the second preset time period including the first preset time period, to enable the processor 231 to perform the operations of: obtaining first position information of a visual residence area of a target object in a virtual three-dimensional space within each first preset time period; obtaining visual distribution information of the target object in the virtual three-dimensional space according to the first position information within a second preset time period; further generating a target placement position in the virtual three-dimensional space according to the visual distribution information; and placing a media file at the target placement position in the virtual three-dimensional space.

Optionally, the foregoing input/output device 237 includes, but is not limited to, a display, configured to display a real-time picture obtained by the processor 231, an eye tracking device, configured to track and input a moving track of an eye to the processor 231, and a tracking system, configured to track and input position information and motion information of a user in a real three-dimensional space to the processor 231, and may include a power supply, a sensor, a transmitter, and the like.

It should be noted that functions implemented by the foregoing input/output device 237 are merely an example implementations of the embodiments, and may further include other input/output functions of the VR device. Any manner capable of avoiding a problem of low media file placement efficiency caused by manually determining a target placement position in a virtual three-dimensional space, placing a media file in a virtual three-dimensional space, and achieving a technical effect of improving media file placement efficiency falls within the protection scope. Examples are provided herein one by one for description.

According to the embodiments, a solution for placing a media file is provided. In the embodiments, first position information of a visual residence area of a target object in a virtual three-dimensional space within each first preset time period is obtained; visual distribution information of the target object in the virtual three-dimensional space is obtained according to the first position information within a second preset time period, the second preset time period including the first preset time period; a target placement position in the virtual three-dimensional space is generated according to the visual distribution information; and a media file is placed at the target placement position in the virtual three-dimensional space. Because the visual distribution information is obtained according to the first position information of the visual residence area of the target object in the virtual three-dimensional space within each first preset time period, the target placement position in the virtual three-dimensional space is generated according to the visual distribution information, and further, the media file is placed at the target placement position, a problem of low media file placement efficiency resulting from manually determining a target placement position in a virtual three-dimensional space is avoided, and a media file is placed in a virtual three-dimensional space, thereby achieving a technical effect of improving media file placement efficiency and solving a technical problem of low media file placement efficiency in the related technology.

Optionally, for a specific example in this embodiment, refer to the examples described in the foregoing embodiments, and details are not described herein again in this embodiment.

A person of ordinary skill in the art may understand that the structure shown in FIG. 23 is merely illustrative. The VR device may be a device such as a VR helmet, VR glasses, or a VR all-in-one machine. FIG. 23 does not limit the structure of the foregoing VR device. For example, the VR device may alternatively include more or less components (such as a network interface and a display apparatus) than those shown in FIG. 23, or has a configuration different from that shown in FIG. 23.

A person of ordinary skill in the art may understand that all or some of the operations of the various methods of the foregoing embodiments may be implemented by a computer program instructing relevant hardware. The program may be stored in a computer-readable storage medium.

This embodiment of this application further provides a storage medium. Optionally, in this embodiment, the foregoing storage medium stores a computer program. The computer program is configured to perform, when being run, the method for placing a media file.

Optionally, in this embodiment, the foregoing storage medium may be located in at least one of a plurality of network devices in the network illustrated in the foregoing embodiment.

Optionally, in this embodiment, the storage medium is set to store program code used for performing the following operations:

obtaining first position information of a visual residence area of a target object in a virtual three-dimensional space within each first preset time period;

obtaining visual distribution information of the target object in the virtual three-dimensional space according to the first position information within a second preset time period, the second preset time period including the first preset time period;

generating a target placement position in the virtual three-dimensional space according to the visual distribution information; and placing a media file at the target placement position in the virtual three-dimensional space.

Optionally, the storage medium is further configured to store program code for performing the following operations: obtaining a first visual residence plane of the target object in the virtual three-dimensional space within the first preset time period; obtaining a first moving track of an eye of the target object within the first preset time period; obtaining the visual residence area on the first visual residence plane according to the first moving track and a preset visual range, where the preset visual range is a range of a visual area in which the visual area has a preset definition or higher when the target object views the visual area in the three-dimensional space; and recording the first position information of the visual residence area on the first visual residence plane in the virtual three-dimensional space.

Optionally, the storage medium is further configured to store program code for performing the following operations: obtaining second position information of the head of the target object in the virtual three-dimensional space and visual field orientation information of the target object, where the visual field orientation information is used for indicating an orientation of a visual field of the target object in the virtual three-dimensional space; and processing the second position information and the visual field orientation information according to a preset parameter, to obtain the first visual residence plane of the target object in the virtual three-dimensional space.

Optionally, the storage medium is further configured to store program code for performing the following operations: obtaining first three-dimensional coordinates of each point in the first visual residence plane in the three-dimensional space; obtaining, from the first three-dimensional coordinates, second three-dimensional coordinates of each point in the visual residence area on the first visual residence plane in the virtual three-dimensional space; and recording the second three-dimensional coordinates.

Optionally, the storage medium is further configured to store program code used for performing the following operations: determining whether the target object leaves the virtual three-dimensional space after the first position information of the visual residence area in the virtual three-dimensional space is recorded; obtaining a second visual residence plane of the target object in the virtual three-dimensional space within the first preset time period if it is determined that the target object does not leave the virtual three-dimensional space; obtaining a second moving track of the eye of the target object within the first preset time period; obtaining the visual residence area on the second visual residence plane according to the second moving track and the preset visual range; and recording the first position information of the visual residence area on the second visual residence plane in the virtual three-dimensional space.

Optionally, the storage medium is further configured to store program code for performing the following operation: recording, after whether the target object leaves the virtual three-dimensional space is determined, a residence time of the target object in the virtual three-dimensional space if it is determined that the target object leaves the virtual three-dimensional space.

Optionally, the storage medium is further configured to store program code for performing the following operations: obtaining a visual residence time of visual residence performed by the target object at each point in the first position information; performing normalization processing on the visual residence time of each point according to the residence time of the target object in the virtual three-dimensional space to obtain a visual residence amount of each point; and generating the visual distribution information from the visual residence amount of each point.

Optionally, the storage medium is further configured to store program code for performing the following operations: obtaining a largest visual residence amount in the visual distribution information; generating a first target page section from the largest visual residence amount; and determining, according to a type of the media file, a preset position in the first target page section as the target placement position.

Optionally, the storage medium is further configured to store program code for performing the following operations: determining a second target page section corresponding to the largest visual residence amount in the first target page section as the target placement position when the media file is a main text media file; and determining a third target page section apart from a side edge of the first target page section by a preset distance as the target placement position when the media file is a sidebar media file.

Optionally, the storage medium is further configured to store program code for performing the following operations: obtaining first behavioral characteristic data of the target object in the virtual three-dimensional space and/or second behavioral characteristic data of the target object outside the virtual three-dimensional space; and determining the media file according to the first behavioral characteristic data and/or the second behavioral characteristic data.

Optionally, the storage medium is further configured to store program code for performing the following operations: obtaining target behavioral characteristic data according to the first behavioral characteristic data, a first parameter corresponding to the first behavioral characteristic data, the second behavioral characteristic data, and a second parameter corresponding to the second behavioral characteristic data, where the first behavioral characteristic data and the second behavioral characteristic data are different behavioral characteristic data of a same characteristic behavior, and a direction in which a value of the first parameter changes with time is opposite to a direction in which a value the second parameter changes with time; and determining the media file according to the target behavioral characteristic data.

Optionally, the storage medium is further configured to store program code for performing the following operations: obtaining a login account used by the target object to log in to a virtual reality application, where the target object enters the virtual three-dimensional space through the virtual reality application; obtaining identification information associated with the login account; and determining the media file according to the identification information.

Optionally, for a specific example in this embodiment, refer to the examples described in Embodiment 1 and Embodiment 2, and details are not described herein again in this embodiment.

Optionally, in this embodiment, the foregoing storage medium may include but is not limited to: any medium that can store program code, such as a USB flash drive, a read-only memory (ROM), a random access memory (RAM), a removable hard disk, a magnetic disk, or an optical disc.

In the embodiments, first position information of a visual residence area of a target object in a virtual three-dimensional space within each first preset time period is obtained; visual distribution information of the target object in the virtual three-dimensional space is obtained according to the first position information within a second preset time period, the second preset time period including the first preset time period; a target placement position in the virtual three-dimensional space is generated according to the visual distribution information; and a media file is placed at the target placement position in the virtual three-dimensional space. Because the visual distribution information is obtained according to the first position information of the visual residence area of the target object in the virtual three-dimensional space within each first preset time period, the target placement position in the virtual three-dimensional space is generated according to the visual distribution information, and further, the media file is placed at the target placement position, a problem of low media file placement efficiency resulting from manually determining a target placement position in a virtual three-dimensional space is avoided, and a media file is placed in a virtual three-dimensional space, thereby achieving a technical effect of improving media file placement efficiency and solving a technical problem of low media file placement efficiency in the related technology.

The method and apparatus for placing a media file, the storage medium, and the VR device according to the disclosure are described above using examples with reference to the accompanying drawings. However, a person skilled in the art should understand that various improvements can be made on the method and apparatus for placing a media file, the storage medium, and the VR device provided in the disclosure without departing from the content of the disclosure. Therefore, the protection scope of the disclosure should be determined on the content of the attached claims.

The sequence numbers of the preceding embodiments are merely for description purpose but do not indicate the preference of the embodiments.

When the integrated unit in the foregoing embodiment is implemented in a form of a software functional module and sold or used as an independent product, the integrated unit may be stored in the foregoing computer-readable storage medium. Based on such an understanding, the technical solutions of the embodiments essentially, or the part contributing to the related technology, or all or some of the technical solutions may be implemented in a form of a software product. The computer software product is stored in a storage medium and includes several instructions for instructing one or more computer devices (which may be a personal computer, a server, a network device, or the like) to perform all or some of the operations of the methods described in the embodiments.

In the foregoing embodiments, descriptions of the embodiments have different emphases, and as for parts that are not described in detail in one embodiment, reference can be made to the relevant description of the other embodiments.

In the several embodiments provided in the present application, it should be understood that the disclosed client may be implemented in other manners. The described apparatus embodiments are merely exemplary. For example, the unit division is merely logical function division and may be other division during actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware, or may be implemented in a form of a software functional unit.

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments are merely intended for describing the technical solutions, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A method for placing a media file in a virtual three-dimensional space, comprising:
   obtaining, by at least one processor, first position information of a visual residence area of a target object in the virtual three-dimensional space within a first preset time period, the visual residence area indicating an area to which an eye of the target object is directed in the virtual three-dimensional space;
   obtaining, by the at least one processor, visual distribution information of the target object in the virtual three-dimensional space based on first position information within a second preset time period, the second preset time period comprising the first preset time period;
   generating, by the at least one processor, a target placement position in the virtual three-dimensional space based on the visual distribution information; and
   providing, by the at least one processor, a media file at the target placement position in the virtual three-dimensional space.

2. The method according to claim 1, wherein the obtaining the first position information comprises:
   obtaining a first visual residence plane of the target object in the virtual three-dimensional space within the first preset time period;
   obtaining a first moving track of the eye of the target object within the first preset time period;
   obtaining the visual residence area on the first visual residence plane based on the first moving track and a preset visual range, wherein the preset visual range indicating a range of a visual area in which the visual area has a preset definition or higher when viewed by the target object in the three-dimensional space; and
   recording the first position information of the visual residence area on the first visual residence plane in the virtual three-dimensional space.

3. The method according to claim 2, wherein the obtaining the first visual residence plane comprises:
   obtaining second position information of a head of the target object in the virtual three-dimensional space and visual field orientation information of the target object, the visual field orientation information indicating an orientation of a visual field of the target object in the virtual three-dimensional space; and
   processing the second position information and the visual field orientation information based on a preset parameter, to obtain the first visual residence plane of the target object in the virtual three-dimensional space.

4. The method according to claim 2, wherein:
   the obtaining the first visual residence plane comprises:
   obtaining first three-dimensional coordinates of each point in the first visual residence plane in the three-dimensional space, and the recording comprises:
   obtaining, based on the first three-dimensional coordinates, second three-dimensional coordinates of each point in the visual residence area on the first visual residence plane in the virtual three-dimensional space; and recording the second three-dimensional coordinates.

5. The method according to claim 2, further comprising:
   determining whether the target object leaves the virtual three-dimensional space;
   obtaining a second visual residence plane of the target object in the virtual three-dimensional space within a next first preset time period in response to determining that the target object does not leave the virtual three-dimensional space;
   obtaining a second moving track of the eye of the target object within the next first preset time period;
   obtaining the visual residence area on the second visual residence plane based on the second moving track and the preset visual range; and
   recording the first position information of the visual residence area on the second visual residence plane in the virtual three-dimensional space.

6. The method according to claim 5, further comprising:
   recording a residence time of the target object in the virtual three-dimensional space in response to determining that the target object leaves the virtual three-dimensional space.

7. The apparatus according to claim 5, wherein the program code further comprises:
   code configured to cause the at least one processor to record a residence time of the target object in the virtual three-dimensional space in response to determining that the target object leaves the virtual three-dimensional space.

8. The method according to claim 1, wherein the obtaining the visual distribution information comprises:
   obtaining a visual residence time of visual residence performed by the target object at each point in the first position information, the visual residence time indicating a time period in which the visual residence area is viewed by the target object;
   performing normalization processing on the visual residence time of each point based on the residence time of the target object in the virtual three-dimensional space, to obtain a visual residence amount of each point; and
   generating the visual distribution information based on the visual residence amount of each point.

9. The method according to claim 8, wherein the generating the target placement position comprises:
   obtaining a largest visual residence amount in the visual distribution information;
   generating a first target page section based on the largest visual residence amount; and
   determining, based on a type of the media file, a preset position in the first target page section as the target placement position.

10. The method according to claim 9, wherein the determining the preset position in the first target page section comprises:
    determining a second target page section corresponding to the largest visual residence amount in the first target page section as the target placement position in response to the media file being a main text media file; and
    determining a third target page section, that is apart from a side edge of the first target page section by a preset distance, as the target placement position in response to the media file being a sidebar media file.

11. The method according to claim 1, further comprising:
    obtaining first behavioral characteristic data of the target object in the virtual three-dimensional space and/or second behavioral characteristic data of the target object outside the virtual three-dimensional space; and
    determining the media file based on the first behavioral characteristic data and/or the second behavioral characteristic data.

12. The method according to claim 11, wherein the determining the media file based on the first behavioral characteristic data and/or the second behavioral characteristic data comprises:

obtaining target behavioral characteristic data based on the first behavioral characteristic data, a first parameter corresponding to the first behavioral characteristic data, the second behavioral characteristic data, and a second parameter corresponding to the second behavioral characteristic data, wherein the first behavioral characteristic data and the second behavioral characteristic data are different behavioral characteristic data with respect to a same characteristic behavior, and a direction in which a value of the first parameter changes with time is opposite to a direction in which a value the second parameter changes with time; and determining the media file based on the target behavioral characteristic data.

13. The method according to claim 11, wherein the obtaining the second behavioral characteristic data comprises:

obtaining a login account of the target object in a virtual reality application, based on which the virtual three-dimensional space is provided to the target object;

obtaining identification information associated with the login account; and determining the media file based on the identification information.

14. An apparatus for placing a media file in a virtual three-dimensional space, comprising:

at least one memory operable to store program code; and at least one processor operable to read the program code and operate as instructed by the program code, the program code comprising:

first obtaining code configured to cause the at least one processor to obtain first position information of a visual residence area of a target object in the virtual three-dimensional space within a first preset time period, the visual residence area indicating an area to which an eye of the target object is directed in the virtual three-dimensional space;

second obtaining code configured to cause the at least one processor to obtain visual distribution information of the target object in the virtual three-dimensional space based on first position information within a second preset time period, the second preset time period comprising the first preset time period;

generation code configured to cause the at least one processor to generate a target placement position in the virtual three-dimensional space based on the visual distribution information; and placement code configured to cause the at least one processor to provide a media file at the target placement position in the virtual three-dimensional space.

15. The apparatus according to claim 14, wherein the first obtaining code comprises:

second obtaining code configured to cause the at least one processor to obtain a first visual residence plane of the target object in the virtual three-dimensional space within the first preset time period;

third obtaining code configured to cause the at least one processor to obtain a first moving track of the eye of the target object within the first preset time period;

fourth obtaining code configured to cause the at least one processor to obtain the visual residence area on the first visual residence plane based on the first moving track and a preset visual range, wherein the preset visual range indicates a range of a visual area in which the visual area has a preset definition or higher when viewed by the target object in the three-dimensional space; and recording code configured to cause the at least one processor to record the first position information of the visual residence area on the first visual residence plane in the virtual three-dimensional space.

16. The apparatus according to claim 15, wherein the second obtaining code is further configured to cause the at least one processor to:

obtain second position information of a head of the target object in the virtual three-dimensional space and visual field orientation information of the target object, wherein the visual field orientation information indicating an orientation of a visual field of the target object in the virtual three-dimensional space; and process the second position information and the visual field orientation information based on a preset parameter, to obtain the first visual residence plane of the target object in the virtual three-dimensional space.

17. The apparatus according to claim 15, wherein the second obtaining code is further configured to cause the at least one processor to obtain first three-dimensional coordinates of each point in the first visual residence plane in the three-dimensional space, and the recording code is further configured to cause the at least one processor to obtain, based on the first three-dimensional coordinates, second three-dimensional coordinates of each point in the visual residence area on the first visual residence plane in the virtual three-dimensional space, and record the second three-dimensional coordinates.

18. The apparatus according to claim 15, wherein the program code further comprises:

code configured to cause the at least one processor to determine whether the target object leaves the virtual three-dimensional space;

code configured to cause the at least one processor to obtain a second visual residence plane of the target object in the virtual three-dimensional space within a next first preset time period in response to determining that the target object does not leave the virtual three-dimensional space;

code configured to cause the at least one processor to obtain a second moving track of the eye of the target object within the next first preset time period;

code configured to cause the at least one processor to obtain the visual residence area on the second visual residence plane based on the second moving track and the preset visual range; and code configured to cause the at least one processor to record the first position information of the visual residence area on the second visual residence plane in the virtual three-dimensional space.

19. The apparatus according to claim 14, wherein the second obtaining code comprises:

code configured to cause the at least one processor to obtain a visual residence time of visual residence performed by the target object at each point in the first position information, the visual residence time indicating a time period in which the visual residence area is viewed by the target object;

code configured to cause the at least one processor to perform normalization processing on the visual residence time of each point based on the residence time of the target object in the virtual three-dimensional space, to obtain a visual residence amount of each point; and code configured to cause the at least one processor to generate the visual distribution information based on the visual residence amount of each point.

20. A non-transitory computer storage medium storing instructions executable by at least one processor to perform:
obtaining first position information of a visual residence area of a target object in the virtual three-dimensional space within first preset time period, the visual residence area indicating an area to which an eye of the target object is directed in the virtual three-dimensional space;
obtaining visual distribution information of the target object in the virtual three-dimensional space based on first position information within a second preset time period, the second preset time period comprising the first preset time period;
generating a target placement position in the virtual three-dimensional space based on the visual distribution information; and
providing a media file at the target placement position in the virtual three-dimensional space.

* * * * *